US008159433B2

(12) United States Patent
Hotta et al.

(10) Patent No.: US 8,159,433 B2

(45) Date of Patent: Apr. 17, 2012

(54) LIQUID CRYSTAL DRIVE APPARATUS AND LIQUID CRYSTAL DISPLAY APPARATUS

(75) Inventors: Aira Hotta, Machida (JP); Haruhiko Okumura, Fujisawa (JP); Hironori Minamizaki, Kawasaki (JP); Hisashi Sasaki, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 917 days.

(21) Appl. No.: 12/190,719

(22) Filed: Aug. 13, 2008

(65) Prior Publication Data

US 2009/0058775 A1 Mar. 5, 2009

(30) Foreign Application Priority Data

Aug. 28, 2007 (JP) ................................ 2007-221031

(51) Int. Cl.

*G09G 3/36* (2006.01)
*G09G 5/00* (2006.01)
*G09G 5/10* (2006.01)
*G06F 3/038* (2006.01)

(52) U.S. Cl. ............. 345/88; 345/89; 345/204; 345/690

(58) Field of Classification Search ............ 345/87–104, 345/204–215, 690–699

See application file for complete search history.

(56) References Cited

U.S. PATENT DOCUMENTS

| | | | | |
|---|---|---|---|---|
| 7,106,286 B2 * | 9/2006 | Baba et al. | ...................... | 345/88 |
| 7,184,008 B2 * | 2/2007 | Baba et al. | ...................... | 345/88 |
| 2003/0174110 A1 * | 9/2003 | Baba et al. | ...................... | 345/88 |
| 2006/0077161 A1 * | 4/2006 | Baba et al. | ...................... | 345/89 |
| 2007/0040779 A1 * | 2/2007 | Baba et al. | ...................... | 345/87 |
| 2007/0279574 A1 * | 12/2007 | Minamizaki et al. | ......... | 349/192 |
| 2009/0289935 A1 * | 11/2009 | Hotta et al. | .................. | 345/214 |

FOREIGN PATENT DOCUMENTS

| | | |
|---|---|---|
| JP | 2003-264846 | 9/2003 |
| JP | 2006-251793 | 9/2006 |

OTHER PUBLICATIONS

Masahiro Baba, et al.,"9-1: Software Processed Level-Adaptive Overdrive (SLAO) Method for Multi-Media LCDs with YUV Video Data", Euro Display, 2002, pp. 155-158.

K. Nakanishi, et al.,"29.3: Fast Response 15-in. XGA TFT-LCD with Feedforward Driving (FFD) Technology for Multimedia Applications", SID 01 Digest, 2001, pp. 488-491.

* cited by examiner

*Primary Examiner* — Alexander Eisen
*Assistant Examiner* — Patrick F Marinelli
(74) *Attorney, Agent, or Firm* — Oblon, Spivak, McClelland, Maier & Neustadt, L.L.P.

(57) ABSTRACT

A liquid crystal drive apparatus includes: a storage unit storing an enhancement correction coefficient having $(1/2^n)\times m$ below a decimal point where n is 3 or 4, and m is an integer which is at least 0 and less than $2^n$; a frame memory holding digital image information of a second frame located one frame before a first frame; a first computation unit computing a difference between digital image information of the first frame and digital image information of the second frame; a second computation unit computing enhancement image information for conducting enhancement display of an image on a liquid crystal panel on the basis of the difference and the enhancement correction coefficient; a third computation unit computing addition information by adding the digital image information of the second frame to the enhancement image information; and a drive signal generation unit generating a drive signal on the basis of the addition information to drive the liquid crystal panel.

20 Claims, 24 Drawing Sheets

(a)

(b)

REGISTER CORRESPONDENCE TABLE

| DDD 123 | α |
|---|---|
| 000 | 1.000 |
| 001 | 1.125 |
| 010 | 1.250 |
| 011 | 1.375 |
| 100 | 1.500 |
| 101 | 1.625 |
| 110 | 1.750 |
| 111 | 1.875 |

| COEFFICIENT $\alpha$ | S1 | S2 | S3 | EXPRESSION |
|---|---|---|---|---|
| 1/4 | 0 | 1/4 | 0 | 0+1/4+0 |
| 5/16 | 0 | 1/4 | 1/16 | 0+1/4+1/16 |
| 3/8 | 0 | 1/4 | 1/8 | 0+1/4+1/8 |
| 4/8 | 1/2 | 0 | 0 | 1/2+0+0 |
| 9/16 | 1/2 | 0 | 1/16 | 1/2+0+1/16 |
| 5/8 | 1/2 | 0 | 1/8 | 1/2+0+1/8 |
| 3/4 | 1/2 | 1/4 | 0 | 1/2+1/4+0 |
| 11/16 | 1/2 | 1/4 | 1/16 | 1/2+1/4+1/16 |

FIG. 15

| COEFFICIENT $\alpha$ | S1 | S2 | S3 | EXPRESSION |
|---|---|---|---|---|
| 4.5 | 4 | 1/2 | 0 | 4+1/2+0 |
| 4.5625 | 4 | 1/2 | 1/16 | 4+1/2+1/16 |
| 4.625 | 4 | 1/2 | 1/8 | 4+1/2+1/8 |
| 4.75 | 4 | 1/2 | 1/4 | 4+1/2+1/4 |
| 5 | 4 | 1 | 0 | 4+1+0 |
| 5.0625 | 4 | 1 | 1/16 | 4+1+1/16 |
| 5.125 | 4 | 1 | 1/8 | 4+1+1/8 |

FIG. 16

| GRAY SCALE LEVEL DECISION | STRAIGHT LINE | $\alpha$ | INTERCEPT REGISTER | S1 | S2 | S3 |
|---|---|---|---|---|---|---|
| 0～255 | STRAIGHT LINE 0 | 1.250 | 0 | 0 | 1 | 1/4 |
| -31～-1 | STRAIGHT LINE 1 | 4.750 | 0 | 4 | 1/2 | 1/4 |
| -255～-32 | STRAIGHT LINE 2 | 0.500 | 148 | 1/2 | 0 | 0 |

FIG. 20

| COEFFICIENT $\alpha$ | S1 | S2 | S3 | EXPRESSION |
|---|---|---|---|---|
| 2 | 0 | 2 | 0 | 0+2+0 |
| 3 | 0 | 2 | 1 | 0+2+1 |
| 4 | 4 | 0 | 0 | 4+0+0 |
| 4.5 | 4 | 1/2 | 0 | 4+1/2+0 |
| 4.5625 | 4 | 1/2 | 1/16 | 4+1/2+1/16 |
| 4.625 | 4 | 1/2 | 1/8 | 4+1/2+1/8 |
| 4.75 | 4 | 1/2 | 1/4 | 4+1/2+1/4 |
| 5 | 4 | 1 | 0 | 4+1+0 |
| 5.0625 | 4 | 1 | 1/16 | 4+1+1/16 |
| 5.125 | 4 | 1 | 1/8 | 4+1+1/8 |
| 5.5 | 4 | 1/2 | 1 | 4+1/2+1 |
| 6 | 4 | 2 | 0 | 4+2 |
| 7 | 4 | 2 | 1 | 4+2+1 |

FIG. 22

| COEFFICIENT $\alpha$ | S1 | S2 | S3 | EXPRESSION |
|---|---|---|---|---|
| 3/16 | 0 | 1/4 | -1/16 | 0+1/4-1/16 |
| 1/4 | 0 | 1/4 | 0 | 0+1/4+0 |
| 5/16 | 0 | 1/4 | 1/16 | 0+1/4+1/16 |
| 3/8 | 0 | 1/4 | 1/8 | 0+1/4+1/8 |
| 7/16 | 1/2 | 0 | -1/16 | 1/2+0-1/8 |
| 4/8 | 1/2 | 0 | 0 | 1/2+0+0 |
| 9/16 | 1/2 | 0 | 1/16 | 1/2+0+1/16 |
| 5/8 | 1/2 | 0 | 1/8 | 1/2+0+1/8 |
| 11/16 | 1/2 | 1/4 | -1/16 | 1/2+1/4-1/16 |
| 3/4 | 1/2 | 1/4 | 0 | 1/2+1/4+0 |
| 11/16 | 1/2 | 1/4 | 1/16 | 1/2+1/4+1/16 |

FIG. 27

LIQUID CRYSTAL DRIVE APPARATUS AND LIQUID CRYSTAL DISPLAY APPARATUS

CROSS-REFERENCE TO RELATED APPLICATION

This application is based upon and claims the benefit of priority from prior Japanese Patent Application No. 2007-221031 filed on Aug. 28, 2007 in Japan, the entire contents of which are incorporated herein by reference.

BACKGROUND OF THE INVENTION

1. Field of the Invention

The present invention relates to a liquid crystal drive apparatus and a liquid crystal display apparatus.

2. Related Art

In recent years, the liquid crystal display has spread in wide fields such as personal computer monitors, notebook computers and television sets. In keeping with this, opportunities to watch moving pictures on liquid crystal displays are increasing intensively. Since the response speed of liquid crystal is not sufficiently fast, however, picture quality degradation such as blur or after image occurs in the liquid crystal display when a moving picture is displayed. In general, since the refresh rate of the liquid crystal display is 60 Hz, a response rate of 16.7 ms or less is set as the target in order to cope with the moving picture display. In recent liquid crystal displays, the response rate between two values, for example, the response rate from gray scale level 0 to gray scale level 255 or from gray scale level 255 to gray scale level 0 in a liquid crystal display of 256 gray scale levels is 16.7 ms or less. However, the response rate between intermediate gray scale levels is at least 16.7 ms.

Typical moving pictures contain a very large number of responses between intermediate gray scale levels. The problem that the response rate between intermediate gray scale levels is not sufficient causes picture quality degradation in moving pictures. Therefore, further improvement of the response rate is demanded.

As for development of the technique for improving the response rate of the liquid crystal display by improving the drive method of the liquid crystal display using the conventional liquid crystal material, a method of writing a gray scale level obtained by adding a predetermined gray scale level to a write gray scale level at the time when a gray scale level displayed on the liquid crystal display is changed as occasion demands into the liquid crystal display is known (see, for example, 2001 SID International Symposium Digest of Technical Papers/Volume XXXII/ISSN-0001-966X, P. 488). Operation in this method will be described hereafter.

The response between gray scale levels on the liquid crystal display is previously measured, and a gray scale level which arrives at one frame later (typically 16.7 ms later) is found. From this result, a write gray scale level needed to cause a change from a certain gray scale level to another certain gray scale level one frame later is found, and this is stored as two-dimensional array data. In other words, if the liquid crystal display has 256 gray scale levels, 256 by 256 array data are needed to store between all gray scale levels. As for image information input to the liquid crystal display, a gray scale level at which a change is started and a gray scale level at which the change is ended are checked for each of red, green and blue sub-pixels of each pixel, and a write gray scale level needed to complete the response one frame later is determined as enhancement image information by referring to the array data. In other words, when image information (gray scale level) changes from $L_0$ to $L_1$, the gray scale level $L_1$ is not written into the liquid crystal display, but a gray scale level $L_\alpha$ from which the gray scale level arrives at the gray scale level $L_1$ one frame later is written into the liquid crystal display by referring to the array data. By using this method, it becomes possible to substantially complete responses between all gray scale levels within one frame, if the liquid crystal display completes a response from every gray scale level to the gray scale level 0 and a response from every gray scale level to the gray scale level 255 (in the case of a liquid crystal display having 256 gray scale levels) within one frame.

However, the above-described scheme in which the enhancement image information $L_\alpha$ is obtained by referring to the array data has a large number of processing steps. Therefore, a method for reducing the number of processing steps by conducting linear approximation on the enhancement correction coefficients to obtain enhancement image information is also proposed (see, for example, JP-A 2006-251793 (KOKAI) and M. Baba et al., "Software Processed Level-Adaptive Overdrive Method for Multi-Media LCDs with YUV Video Data," Euro Display 2002, pp. 155-158). This method reduces the amount of computation by approximating a relation between $L_\alpha - L_0$ and $L_1 - L_0$ with a straight line, calculating the approximation straight line with the least square method, and using a gradient of the calculated straight line as an enhancement correction coefficient $\alpha$ in all gray scale levels.

A concrete system configuration for implementing the above-described conventional drive method will be described briefly. Input image information is input to a gate array together with image information delayed one frame period by a frame memory unit. The gate array outputs address information indicating which data in an array data retention unit storing the array data should be referenced to the array data retention unit on the basis of the input image information and the image information delayed one frame period. The array data retention unit outputs array data stored therein to the gate array on the basis of the address information input thereto. The gate array outputs the array data input thereto to a liquid crystal display apparatus as enhancement image information. An image is thus displayed on the liquid crystal display apparatus.

In recent years, opportunities of watching moving pictures such as 1 segment broadcast have increased on portable telephones as well, and clear image display without moving picture blur is demanded. In portable devices such as portable telephones, low power dissipation, and reduction in size and weight of the apparatus are demanded intensely.

SUMMARY OF THE INVENTION

The present invention has been made in view of these circumstances, and an object of thereof is to provide a liquid crystal drive apparatus and a liquid crystal display apparatus which are less in picture quality degradation and as small as possible in circuit scale.

A liquid crystal drive apparatus according to an aspect of the present invention includes a storage unit configured to store an enhancement correction coefficient having $(1/2^n)\times m$ below a decimal point where n is 3 or 4, and m is an integer which is at least 0 and less than $2^n$; a frame memory configured to hold digital image information of a second frame located one frame before a first frame; a first computation unit configured to compute a difference between digital image information of the first frame and digital image information of the second frame; a second computation unit configured to compute enhancement image information for conducting enhancement display of an image on a liquid crystal panel on the basis of the difference, digital image information of the second frame and the enhancement correction coefficient; a third computation unit configured compute addition information by adding the digital image information of the second frame to the enhancement image information; and a drive signal generation unit configured to generate a drive signal on the basis of the addition information to drive the liquid crystal panel.

A liquid crystal display apparatus according to another aspect of the present invention includes a liquid crystal panel, and the liquid crystal drive apparatus according to the aspect which drives the liquid crystal panel.

BRIEF DESCRIPTION OF THE DRAWINGS

FIG. 15 is a table showing a state selection of an enhancement correction coefficient α;

FIG. 16 is a table showing a state selection of the enhancement correction coefficient α;

FIG. 20 is a table showing a straight line selection and its implementation based on a gray scale level decision;

FIG. 22 is a table showing a state selection in an α multiplier in a second complete example;

FIG. 27 is a table showing a state selection in the α multiplier in the third concrete example.

DESCRIPTION OF THE EMBODIMENTS

Hereafter, embodiments of the present invention will be described in detail.

First Embodiment

Figure 1:
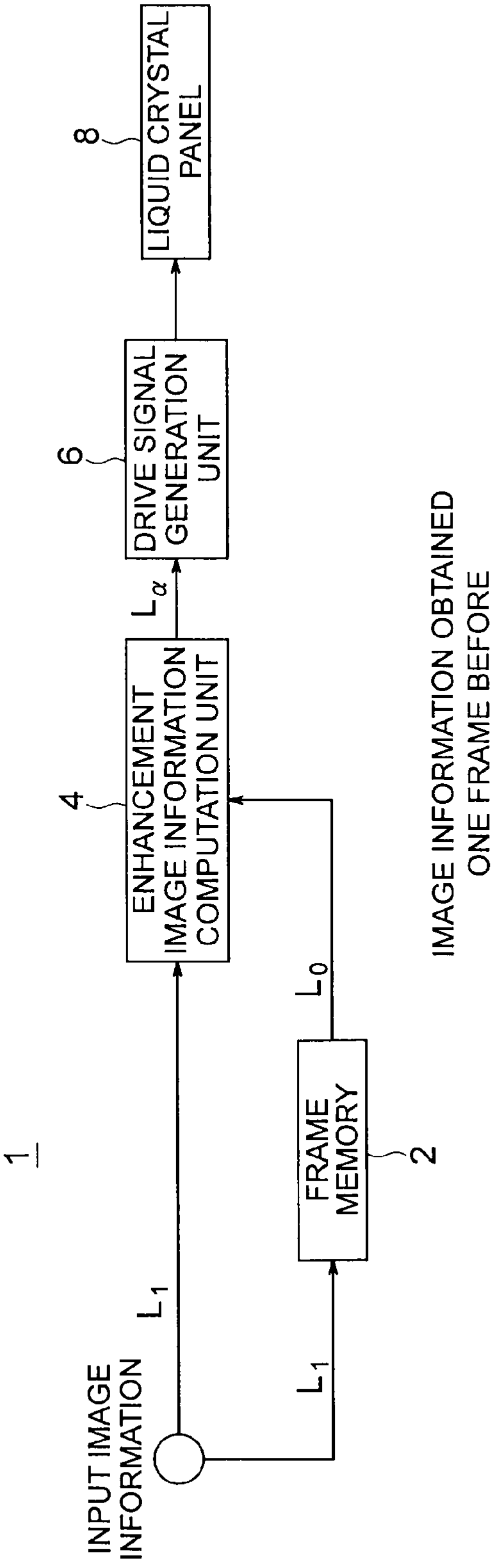
FIG. 1 is a block diagram showing a liquid crystal display apparatus according to a first embodiment.

A liquid crystal display apparatus according to a first embodiment of the present invention is shown in FIG. 1. The liquid crystal display apparatus 1 according to the present embodiment includes a frame memory 2 which holds gray scale levels $L_1$ respectively of color signals (for example, color signals of R (red), G (green) and B (blue)) corresponding to one frame of an input image signal, an enhancement image information computation unit 4, a drive signal generation unit 6, and a liquid crystal panel 8.

Gray scale levels (referred to as input image information as well) $L_1$ of respective color signals in the input image signal input to the liquid crystal display apparatus 1 are sent to the frame memory 2 and stored therein, and sent to the enhancement image information computation unit 4. The enhancement image information computation unit 4 computes enhancement image information Lα on the basis of the gray scale levels $L_1$ of the input image signal and gray scale levels (referred to as delayed image information as well) $L_0$ of respective color signals in the image signal holded in the frame memory 2 and delayed one frame. The enhancement image information computation unit 4 sends the computed enhancement image information $L_\alpha$ to the drive signal generation unit 6. The drive signal generation unit 6 generates a drive signal for driving a liquid crystal panel 8 (for example, an enhancement image signal subjected to digital-analog conversion) on the basis of the computed enhancement image information $L_\alpha$. The liquid crystal panel 8 is driven on the basis of the generated drive signal to display an image.

Letting α be an enhancement correction coefficient, the enhancement image information $L_\alpha$ can be found by using the following expression.

$$L_\alpha=\alpha(L_1-L_0)+L_0$$

When the relation between ($L_\alpha$−$L_0$) and ($L_1$−$L_0$) is approximated by a straight line, the enhancement correction coefficient α can be calculated as the gradient of the approximation straight line by suing the least square method or the like. When the enhancement correction coefficient α is represented by a binary number, it typically becomes a value having, for example, approximately 16 bits below a binary point.

As a result of eager study, the present inventors have obtained finding that display can be conducted without degradation in picture quality even if the enhancement correction coefficient α is approximated by $\beta+(1/2^n)\times m$ where n is 3 or 4, m is an integer which is at least 0 and less than $2^n$, and β is an integer value of the enhancement correction coefficient α (in other words, a maximum integer value which does not exceed α). Hereafter, this will be described.

Using, as reference, the case where the value α found as the gradient of the approximation line for ($L_\alpha$−$L_0$) and ($L_1$−$L_0$) is used as the enhancement correction coefficient, the moving picture quality obtained when using the value of $\alpha+(1/2^n)$ where n=1, 2, 3 or 4 as the enhancement correction coefficient is compared. Results shown in TABLE 1 are obtained.

TABLE 1

| Enhancement correction coefficient | Difference from reference | Difference from reference in view |
|---|---|---|
| $\alpha + 1/2$ | 1/2 | Noticeable |
| $\alpha + 1/4$ | 1/4 | Noticeable |
| $\alpha + 1/8$ | 1/8 | Hardly noticeable |
| $\alpha + 1/16$ | 1/16 | Difference is unnoticeable |

In other words, the difference between them is noticeable when n=1 and 2. On the other hand, when n=3, the difference is slightly noticeable. When n=4, the difference is unnoticeable, i.e., a picture quality equivalent to that of the original moving picture is obtained. If the enhancement correction coefficient is within $\pm 1/2^4$ from the gradient of straight line approximation, therefore, picture quality degradation is not felt visually. Also in the case where the enhancement correction coefficient is within $\pm 1/2^3$ from the gradient of straight line approximation, the difference from the original moving image is scarcely noticeable, and consequently great degradation in picture quality is not felt. Therefore, it is appreciated that a favorable moving image having little degradation in picture quality can be displayed even if the enhancement correction coefficient is approximated by $\beta+(1/2^n)\times m$ when n is 3 or 4.

In the present embodiment, therefore, a value obtained by approximating an enhancement correction coefficient $\alpha'$ found previously from characteristics of the liquid crystal panel 8 on the basis of test results of the liquid crystal display apparatus before product shipping is used as an enhancement correction coefficient $\alpha$ to be used when computing the enhancement image information $L_\alpha$. Here, n is 3 or 4, m is an integer which is at least 1 and less than $2^n$, and $\beta$ is a maximum integer value which does not exceed the previously found enhancement correction coefficient $\alpha'$. In other words, the present embodiment has a configuration which uses a value obtained by rounding down or up a value of four or five bits below a binary point of the enhancement correction coefficient $\alpha'$ previously found from the characteristics of the liquid crystal panel 8, as $\alpha=\beta+(1/2^n)\times m$. By the way, a specific circuit configuration of the enhancement image information computation unit 4 will be described later.

The circuit scale of the enhancement image information computation unit 4 can be reduced remarkably by thus setting the enhancement correction coefficient $\alpha$ to be used when computing the enhancement image information $L\alpha$ equal to $\beta+(1/2^n)\times m$. This is because a multiplier circuit has a maximum circuit scale in the enhancement image information computation unit 4 and consequently it becomes possible to represent the enhancement correction coefficient with a smaller number of bits by using the approximated enhancement correction coefficient $\alpha$. As a result, a liquid crystal drive apparatus including the enhancement image information computation unit 4 and the drive signal generation unit 6 can be made small. Even if the liquid crystal apparatus according to the present embodiment is mounted on a device demanded to be light in weight and small in size such as a portable telephone, high quality moving picture display becomes possible.

In the present embodiment, color signals of R, G and B are used as input image signals. Alternatively, color signals including luminance signals and color difference signals may be used.

According to the present embodiment, it is possible to provide a liquid crystal drive apparatus and a liquid crystal display apparatus which are less in picture quality degradation and as small as possible in circuit scale, as heretofore described.

Second Embodiment

Figure 2:
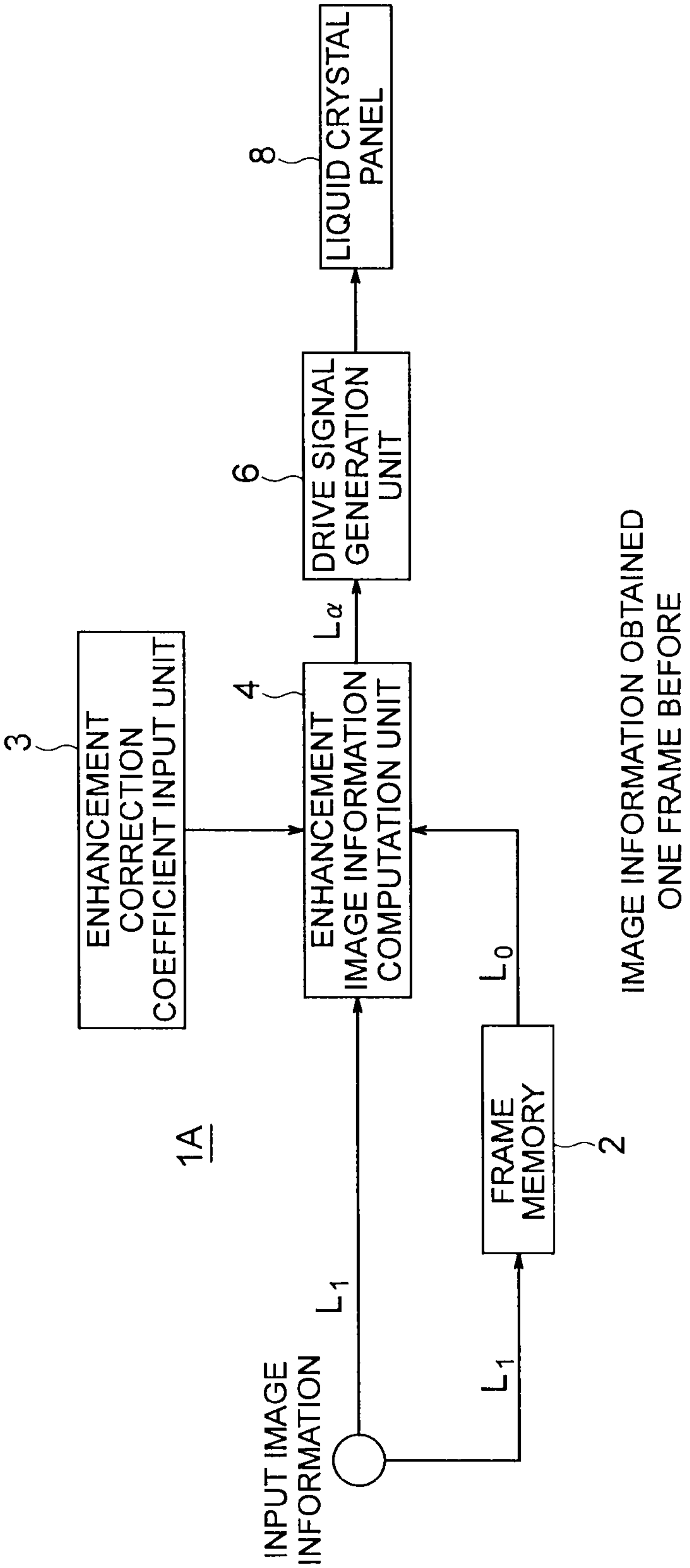
FIG. 2 is a block diagram showing a liquid crystal display apparatus according to a second embodiment.

A liquid crystal display apparatus according to a second embodiment of the present invention is shown in FIG. 2. A liquid crystal display apparatus 1A according to the present embodiment has a configuration obtained by providing an enhancement correction coefficient input unit 3 in the liquid crystal display apparatus 1 according to the first embodiment shown in FIG. 1. The user can input the enhancement correction coefficient via the enhancement correction coefficient input unit 3. A plurality of enhancement correction coefficients are set in the enhancement correction coefficient input unit 3. It is also possible for the user to select one from these enhancement correction coefficients, and the user may newly set an enhancement correction coefficient. The enhancement correction coefficient input unit 3 serves as an interface which makes it possible for the user to select or set an enhancement correction coefficient. The enhancement correction coefficient which can be selected or set has a value of the $\beta+(1/2^n)\times m$ type. Here, n is 3 or 4, m is an integer which is at least 1 and less than $2^n$, and $\beta$ is an integer. The enhancement correction coefficient selected or set by the user via the enhancement correction coefficient input unit 3 is sent to the enhancement image information computation unit 4 and used as the enhancement correction coefficient $\alpha$ to be used when computing the enhancement image information $L_\alpha$. If the user does not select or set an enhancement correction coefficient by using the enhancement correction coefficient input unit 3, a value previously set on the basis of response characteristics of the mounted liquid crystal panel 8 is used as the enhancement correction coefficient to compute the enhancement image information $L_\alpha$.

Figure 3:
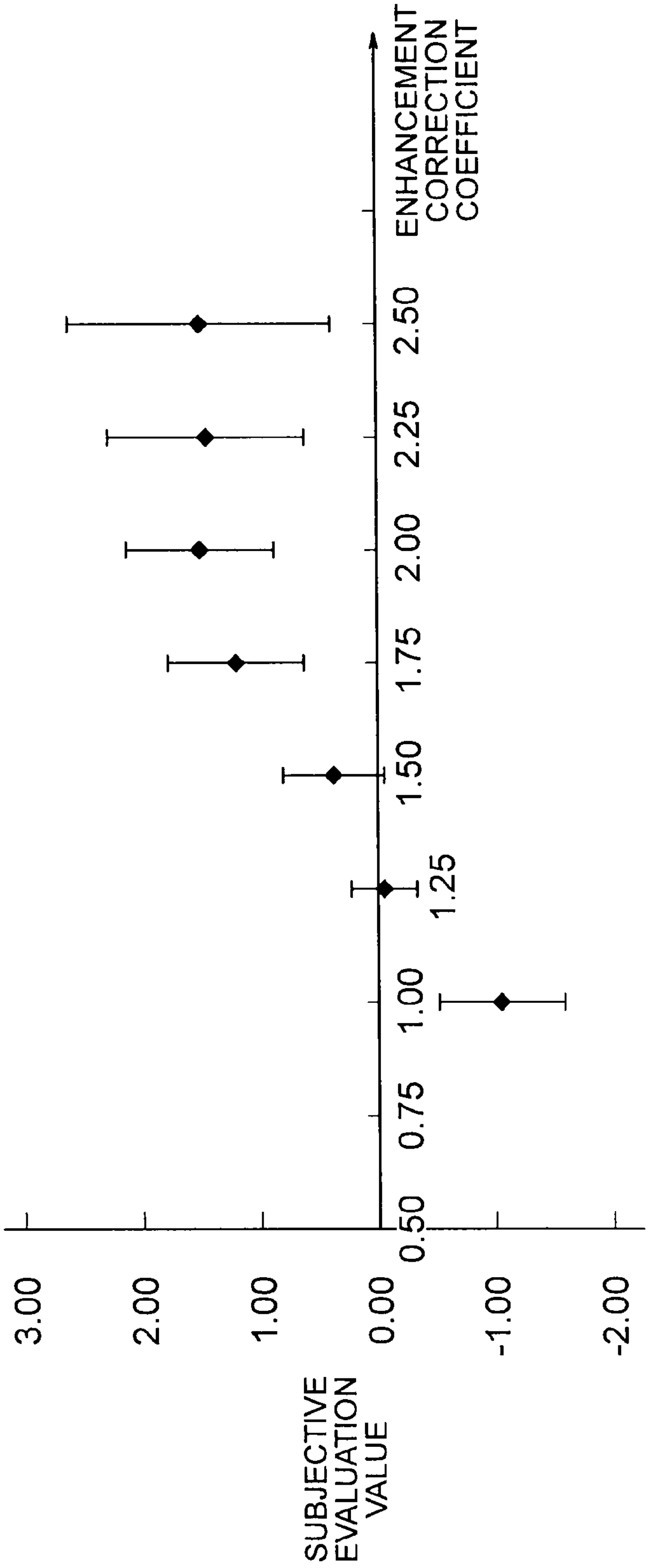
FIG. 3 is a diagram showing picture quality evaluation results obtained when an enhancement correction coefficient is changed.

In the liquid crystal display apparatus according to the present embodiment, the enhancement correction coefficient $\alpha$ is set equal to 1.00 (enhancement correction is not conducted), 1.25, 1.50, 1.75, 2.00, 2.25 and 2.50 by using the enhancement correction coefficient input unit 3. A plurality of persons evaluate the picture quality of an image displayed on the liquid crystal display apparatus. Results are shown in FIG. 3. A black rhomb indicates an average value, and straight lines located above and below the rhomb indicate variations. As appreciated from FIG. 3, many persons highly rate images subjected to stronger enhancement processing. As appreciated from variations in evaluation values, however, preference differs from individual to individual.

In the liquid crystal display apparatus according to the present embodiment, the enhancement correction coefficient $\alpha$ determined previously on the basis of the response rate of the liquid crystal panel can be adjusted as heretofore described. As a result, adjustment such as display suited to the user's taste can be conducted.

It is a matter of course that according to the present embodiment as well a liquid crystal drive apparatus and a liquid crystal display apparatus which are less in picture quality degradation and as small as possible in circuit scale can be provided in the same way as the liquid crystal display apparatus according to the first embodiment.

Third Embodiment

A liquid crystal display apparatus according to a third embodiment of the present invention will now be described.

Figure 4:
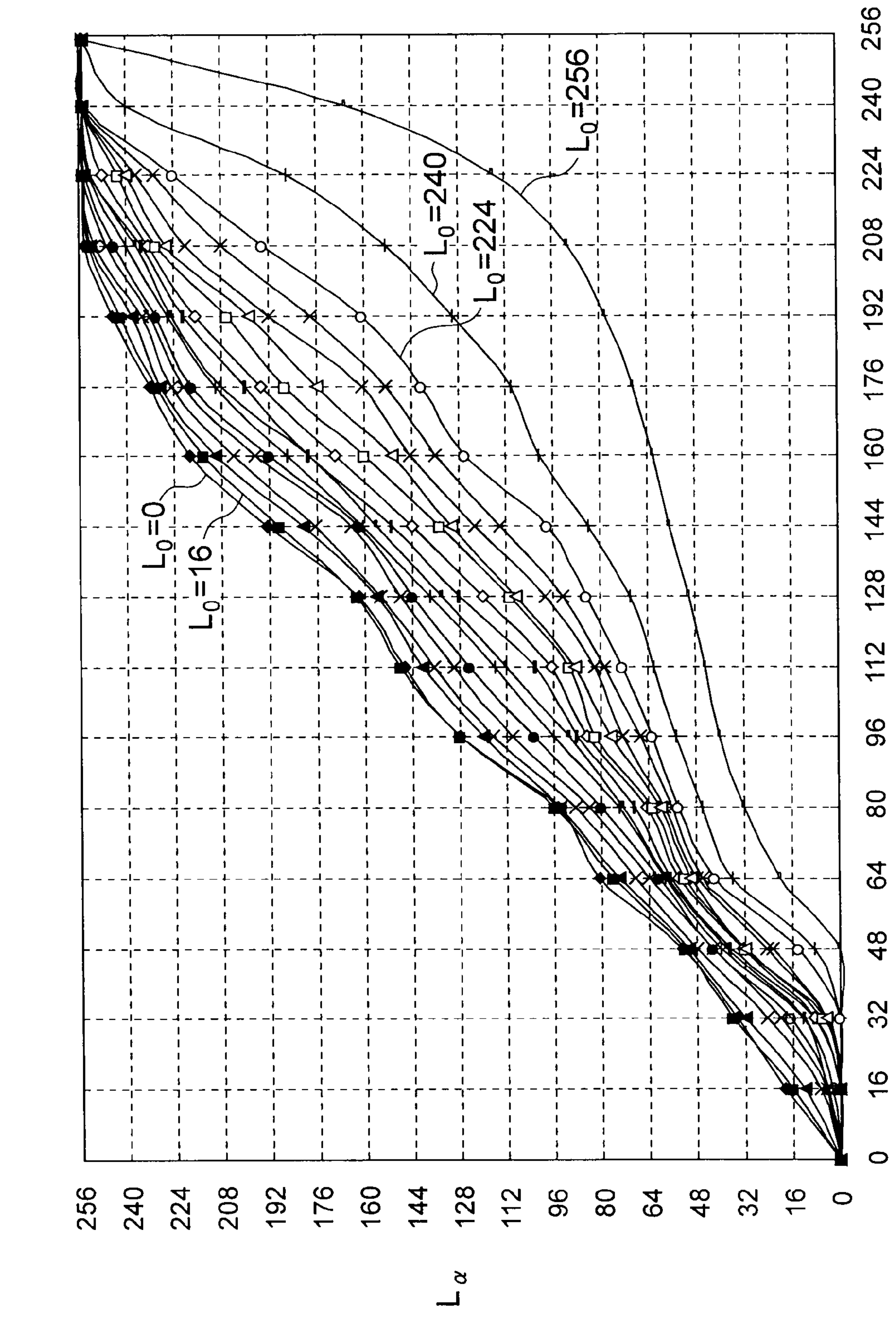
FIG. 4 is a diagram showing measurement results of characteristics of a liquid crystal display in the first embodiment.

Relations between the enhancement image information $L_\alpha$ and the input image information $L_1$ in the liquid crystal display apparatus according to the first embodiment are measured by using the delayed image information $L_0$ as a parameter. Results of the measurement are shown in FIG. 4. This measurement is conducted by changing the delayed image information $L_0$ from gray scale level 0 to gray scale level 256 at intervals of 16 gray scale levels.

Figure 5:
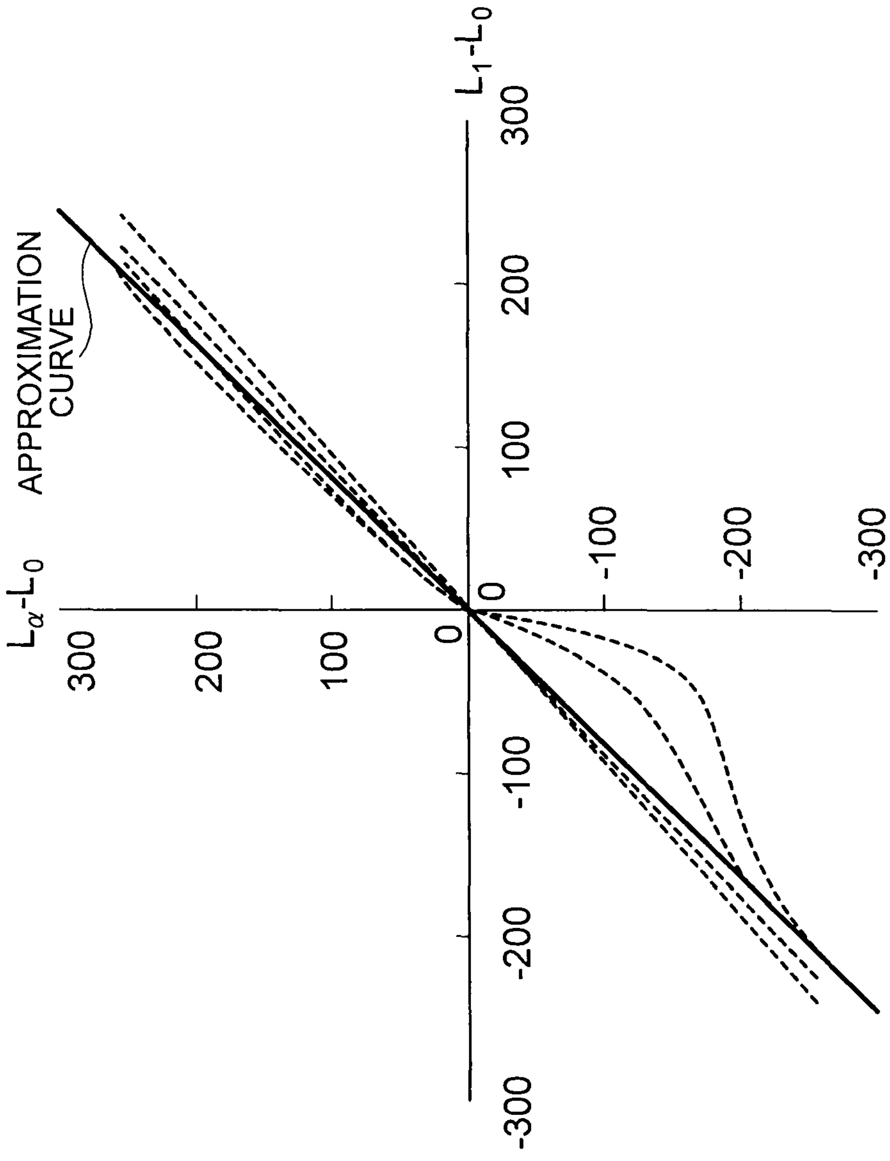
FIG. 5 is a graph obtained by plotting the measurement results shown in FIG. 4 with ($L_\alpha$−$L_0$) taken on an axis of ordinates and ($L_1$−$L_0$) taken on an axis of abscissas.

As $L_0$ changes from gray scale level 0 to gray scale level 256, the graph indicating the relations between the enhancement image information $L_\alpha$ and the input image information $L_1$ gradually changes from the left to the right. Graphs obtained by plotting the measurement results with $(L_\alpha-L_0)$ taken on the ordinate axis and $(L_1-L_0)$ taken on the abscissa axis are shown in FIG. 5. As appreciated from FIG. 5, $(L_\alpha-L_0)$ and $(L_1-L_0)$ have nearly linear relations. As appreciated from FIG. 5, however, discrepancy of actual values of $(L_\alpha-L_0)$ and $(L_1-L_0)$ from an approximation straight line found by using the least square method is large where the delayed image information $L_0$ assumes a value in a certain area. This is caused by an influence of anchoring at an interface between a liquid crystal molecule and an alignment layer.

The present embodiment has a configuration which approximates a straight line for finding the enhancement correction coefficient by a broken line in a gray scale level area where the discrepancy of the actual values from the approximation straight line found by using the least square method is large.

Figure 6:
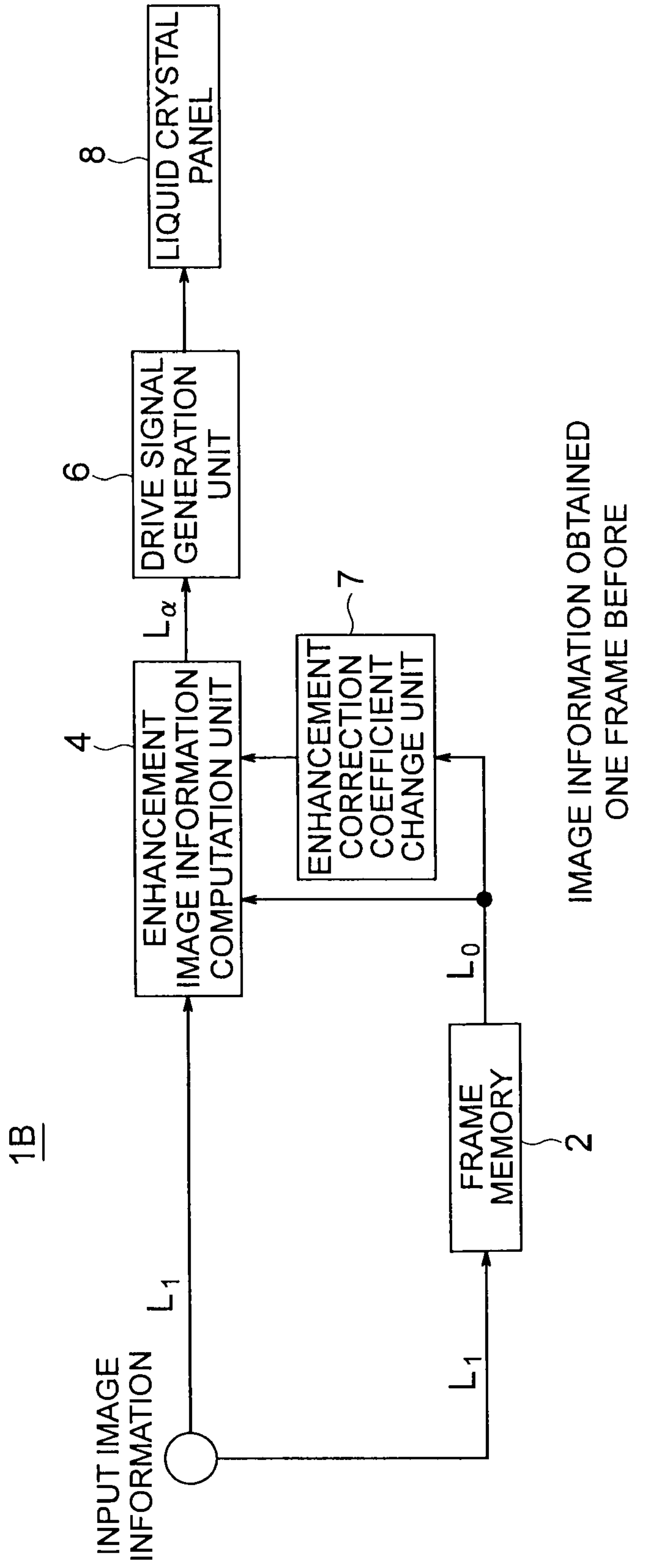
FIG. 6 is a block diagram showing a liquid crystal display apparatus according to a third embodiment.

The liquid crystal display apparatus according to the present embodiment is shown in FIG. 6. A liquid crystal display apparatus 1B according to the present embodiment has a configuration obtained by providing an enhancement correction coefficient change unit 7 in the liquid crystal display apparatus 1 according to the first embodiment shown in FIG. 1. If the delayed image information $L_0$ is in the range of gray scale level 240 to gray scale level 255, the enhancement correction coefficient change unit 7 changes the enhancement correction coefficient to be used to compute the enhancement image information $L_\alpha$. If the delayed image information $L_0$ is not in the range of gray scale level 240 to gray scale level 255, the enhancement correction coefficient change unit 7 does not change the enhancement correction coefficient to be used to compute the enhancement image information $L_\alpha$. In this case, a value previously set on the basis of response characteristics of the mounted liquid crystal panel 8 is used as the enhancement correction coefficient to compute the enhancement image information $L\alpha$ in the enhancement information computation unit 4, in the same way as the case of the first embodiment.

Figure 7:
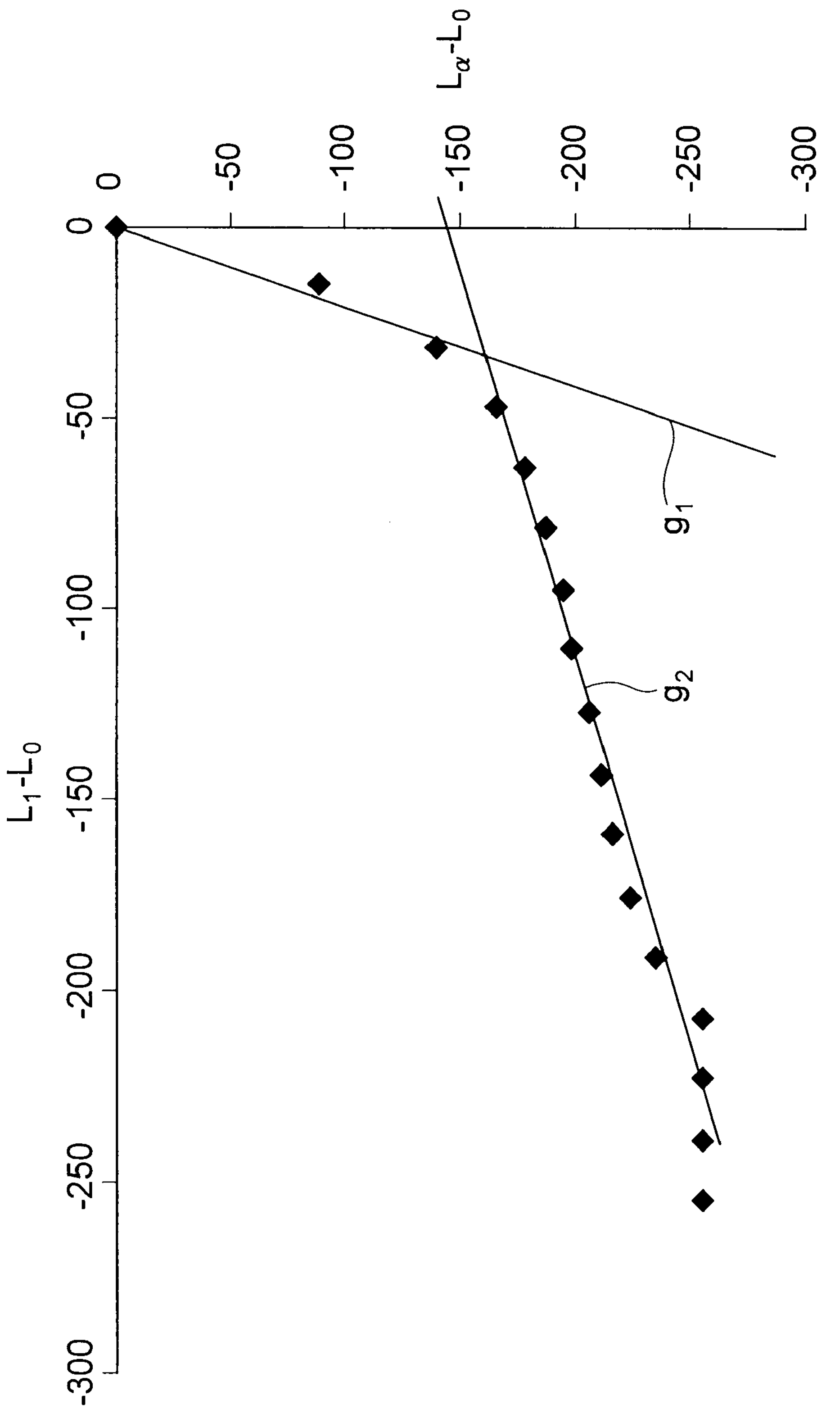
FIG. 7 is a diagram for explaining broken line approximation used in the third embodiment.

If the delayed image information $L_0$ is in the range of gray scale level 240 to gray scale level 255, the enhancement correction coefficient is changed to a value described hereafter. This changed enhancement correction coefficient is found as described below. FIG. 7 shows relations obtained when the delayed image information $L_0$ is gray scale level 255, with $(L_\alpha-L_0)$ taken on the ordinate axis and $(L_1-L_0)$ taken on the abscissa axis. In FIG. 7, an area where $(L_1-L_0)$ is in the range of −31 to 0 is defined as a region having a large gradient, and an approximation straight line in this range is denoted by a straight line $g_1$.

The straight line $g_1$ is found from the relations between $(L_\alpha-L_0)$ and $(L_1-L_0)$ by using the least square method as follows:

$$(L_\alpha-L_0)=4.75(L_1-L_0)$$

An approximation straight line in an area where $(L_1-L_0)$ is not in the range of −31 to 0 is denoted by 92. A relation expression of the straight line 92 is found by using the least square method in the same way. As a result, the straight line $g_2$ is represented as $$(L_\alpha-L_0)=0.44(L_1-L_0)+148$$

Supposing for the relation expressions that the straight line $g_1$ is represented by $(L_\alpha-L_0)=4.75\ (L_1-L_0)$ and the straight line 92 is represented by $(L_\alpha-L_0)=0.5\ (L_1-L_0)+148$, enhancement image information is computed.

In the liquid crystal display apparatus according to the present embodiment having this configuration, the relations between $(L_\alpha-L_0)$ and $(L_1-L_0)$ are approximated by a broken line in an area where the discrepancy is large. Therefore, the discrepancy between the actual $(L_\alpha-L_0)$ and $(L_1-L_0)$ values and the approximating broken line becomes small and moving images of a higher quality can be obtained.

It is a matter of course that according to the present embodiment as well a liquid crystal drive apparatus and a liquid crystal display apparatus which are less in picture quality degradation and as small as possible in circuit scale can be provided in the same way as the liquid crystal display apparatus according to the first embodiment.

Fourth Embodiment

In the third embodiment, the enhancement correction coefficient in a gray scale level area where the discrepancy from the approximation straight line is large is found by using a broken line. A liquid crystal display apparatus according to the present embodiment has a configuration which makes the discrepancy from the approximation straight line small as soon as possible by suitably selecting intercepts of the approximation straight line in a gray scale level area where the discrepancy is large.

Figure 8:
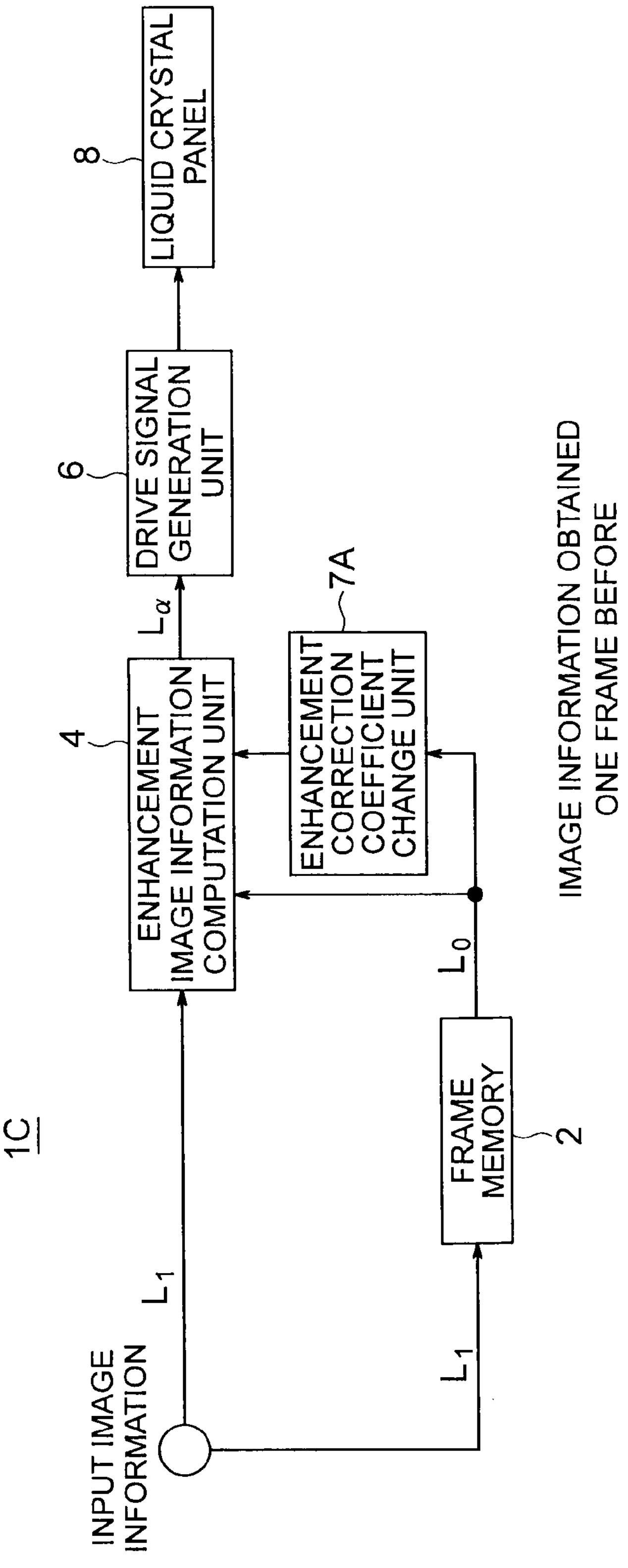
FIG. 8 is a block diagram showing a liquid crystal display apparatus according to a fourth embodiment.

A liquid crystal display apparatus according to the present embodiment is shown in FIG. 8. A liquid crystal display apparatus 1C according to the present embodiment has a configuration obtained by replacing the enhancement correction coefficient change unit 7 with an enhancement correction coefficient change unit 7A in the liquid crystal display apparatus 1B according to the third embodiment.

The enhancement correction coefficient change unit 7A selects intercepts with respect to data obtained when the delayed image information $L_0$ is gray scale level 240 and gray scale level 255. In other words, the enhancement correction coefficient change unit 7A suitably selects intercepts of the approximation straight line when $L_0$ is in the range of gray scale level 232 to gray scale level 255.

Figure 9:
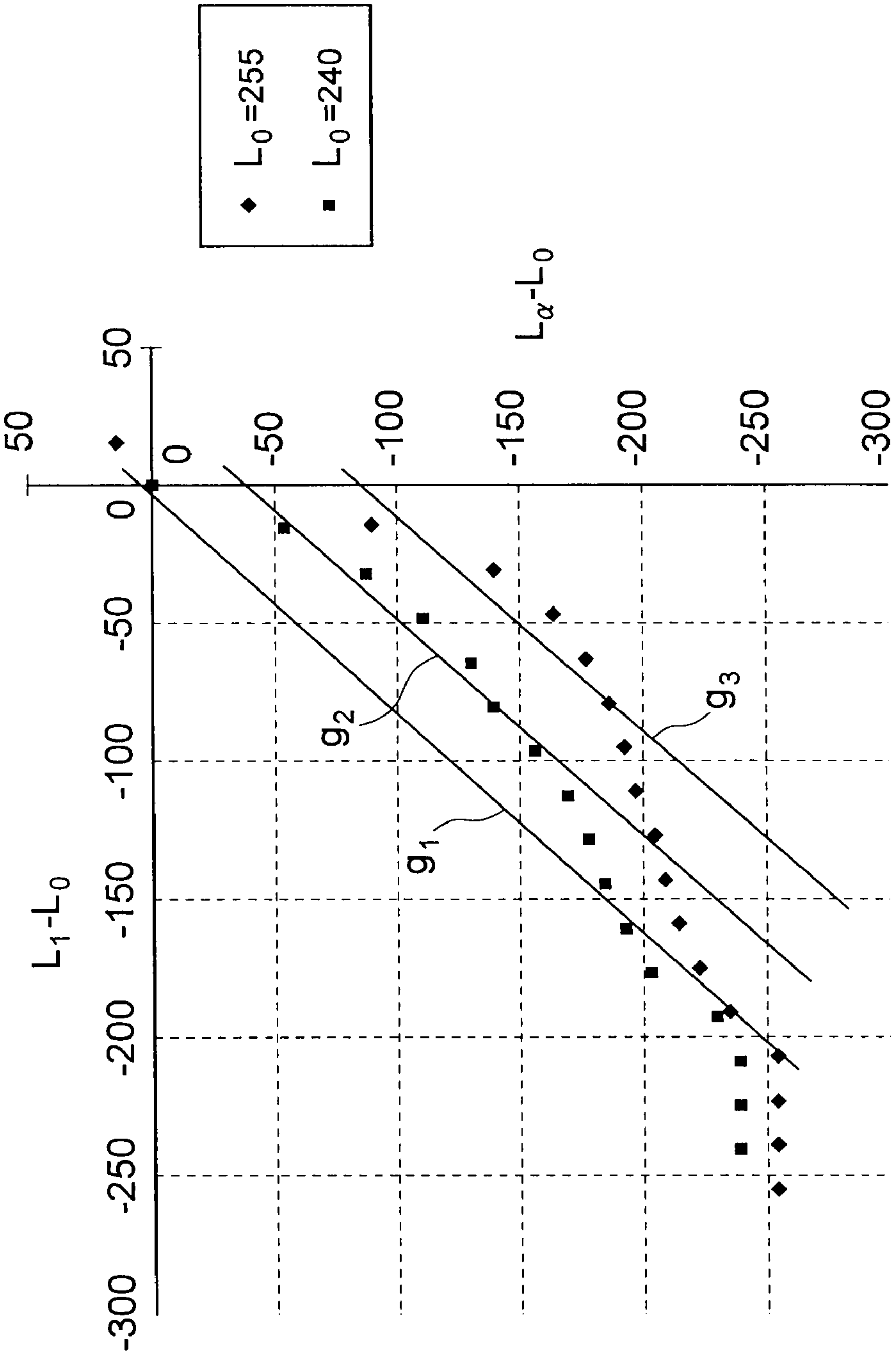
FIG. 9 is a diagram for explaining selection of an intercept used in the fourth embodiment.

FIG. 9 shows relations between $(L_\alpha-L_0)$ indicated along the ordinate axis and $(L_1-L_0)$ indicated along the abscissa axis when the delayed image information $L_0$ is gray scale level 240 and gray scale level 255. In the present embodiment, the enhancement correction coefficient is found by using three straight lines $g_1$, $g_2$ and $g_3$. When the delayed image information $L_0$ is in the range of gray scale level 0 to gray scale level 231, the enhancement correction coefficient is found by using the approximation straight line (the straight line $g_1$ in FIG. 9) which passes through the origin and which is determined in the same way as the first embodiment.

In the area where there is discrepancy from the straight line $g_1$ in the data obtained when the delayed image information $L_0$ is gray scale level 240 and gray scale level 255, the enhancement correction coefficient is found by using the straight line 92 or 93. Although the straight line 92 and the straight line 93 are the same in gradient as the straight line $g_1$, intercepts are 42 and 88, respectively. The intercept value of the straight line 92 is derived mainly from data obtained when $L_0$ is gray scale level 240, so as to minimize the error. The intercept value of the straight line 93 is derived mainly from data obtained when $L_0$ is gray scale level 255, so as to minimize the error. More specifically, the intercept of the straight line 92 is calculated from data obtained when $L_0$ is gray scale level 240 and $L_1$ is in the range of gray scale level 224 to gray scale level 128 and data obtained when $L_0$ is gray scale level 255 and $L_1$ is in the range of gray scale level 112 to gray scale level 144. The intercept of the straight line 93 is calculated from data obtained when $L_0$ is gray scale level 255 and $L_1$ is in the range of gray scale level 240 to gray scale level 160.

As a result, a moving image of high quality can be obtained in the same way as the third embodiment even in an image with $L_0$ being frequently in the range of gray scale level 240 to gray scale level 255.

It is a matter of course that according to the present embodiment as well a liquid crystal drive apparatus and a liquid crystal display apparatus which are less in picture quality degradation and as small as possible in circuit scale can be provided in the same way as the liquid crystal display apparatus according to the first embodiment.

EXAMPLES

A liquid crystal drive apparatus according to examples of the present invention will now be described. Liquid crystal drive apparatuses according to the examples hereafter described represent concrete hardware of a liquid crystal drive apparatus used in a liquid crystal display apparatus according to any of the first to fourth embodiments.

First Example

Figure 10:
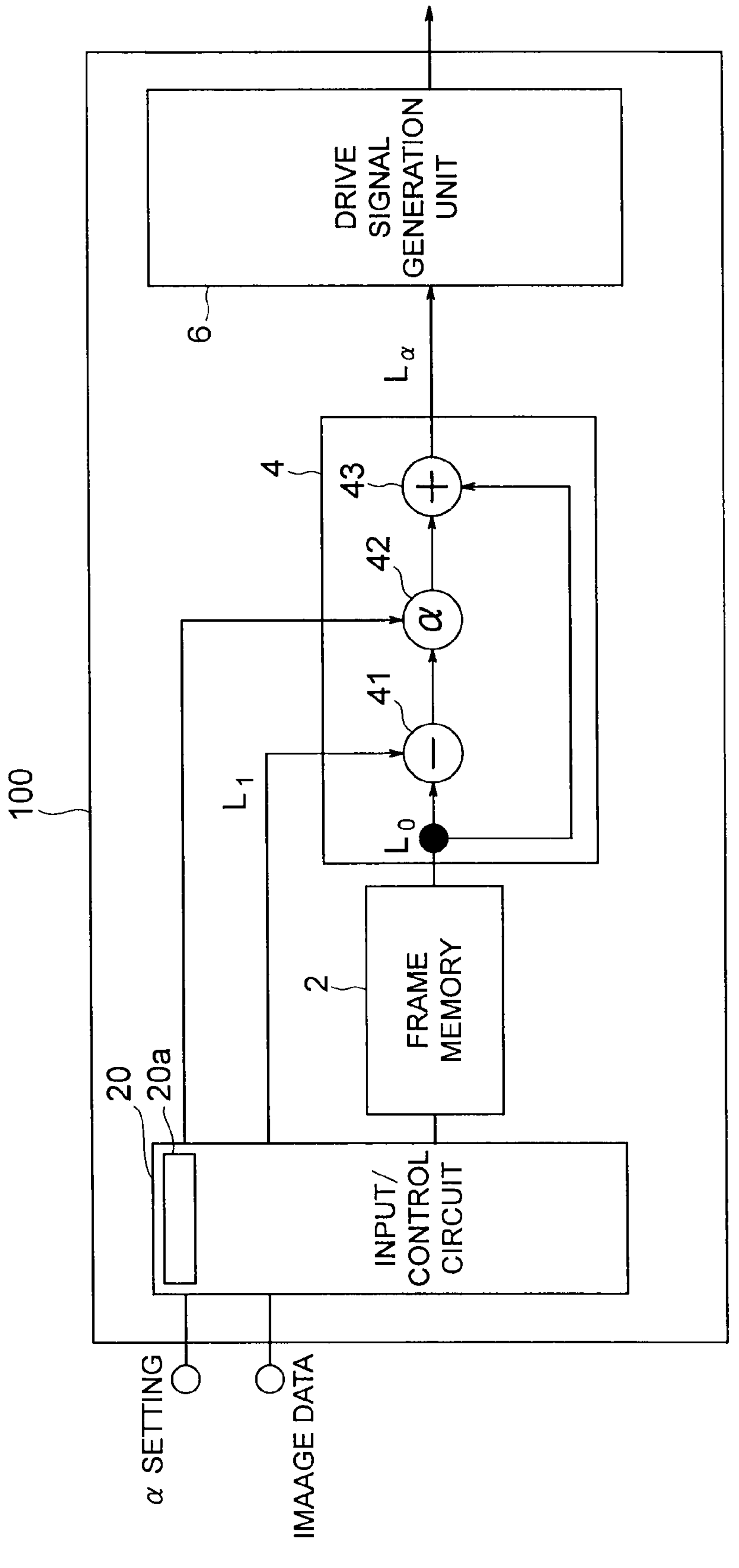
FIG. 10 is a block diagram showing a liquid crystal drive apparatus according to a first example.

A liquid crystal drive apparatus according to a first example of the present invention is shown in FIG. 10. A liquid crystal drive apparatus 100 according to the present example is, for example, a liquid crystal drive IC for portable telephone to be used in the liquid crystal display apparatus according to the first embodiment or the second embodiment. The liquid crystal drive apparatus 100 according to the present example includes an input/control circuit 20 having an enhancement correction coefficient register 20*a*, a frame memory 2, an enhancement image information computation unit 4, and a drive signal generation unit 6.

An enhancement correction coefficient value previously set on the basis of response characteristics of the liquid crystal panel or an enhancement correction coefficient value selected or set by the user is stored in the enhancement correction coefficient register 20*a*. The enhancement image information computation unit 4 includes a subtracter 41, a multiplier 42 and an adder 43.

The input/control circuit 20 sends input image information $L_1$ to the frame memory 2 and the subtracter 41 in the enhancement image information computation unit 4. In addition, the input/control circuit 20 sends an enhancement correction coefficient $\alpha$ to the multiplier 42 in the enhancement image information computation unit 4 via the enhancement correction coefficient register 20*a*.

The subtracter 41 computes a difference $(=L_1-L_0)$ between the input image information $L_1$ sent from the input/control circuit 20 and delayed image information $L_0$ sent from the frame memory 2.

The multiplier 42 multiplies the output $(=L_1-L_0)$ of the subtracter 41 by the enhancement correction coefficient $\alpha$ sent from the enhancement correction coefficient register 20*a*. The adder 43 computes a sum $L_\alpha$ $(=\alpha(L_1-L_0)+L_0)$ of an output $(=\alpha((L_1-L_0))$ of the multiplier 42 and the delayed image information $L_0$ sent from the frame memory 2. The drive signal generation unit 6 generates a drive signal for a liquid crystal panel (not illustrated) on the basis of the sum $L_\alpha$. An image is displayed on the liquid crystal panel.

Figure 11:
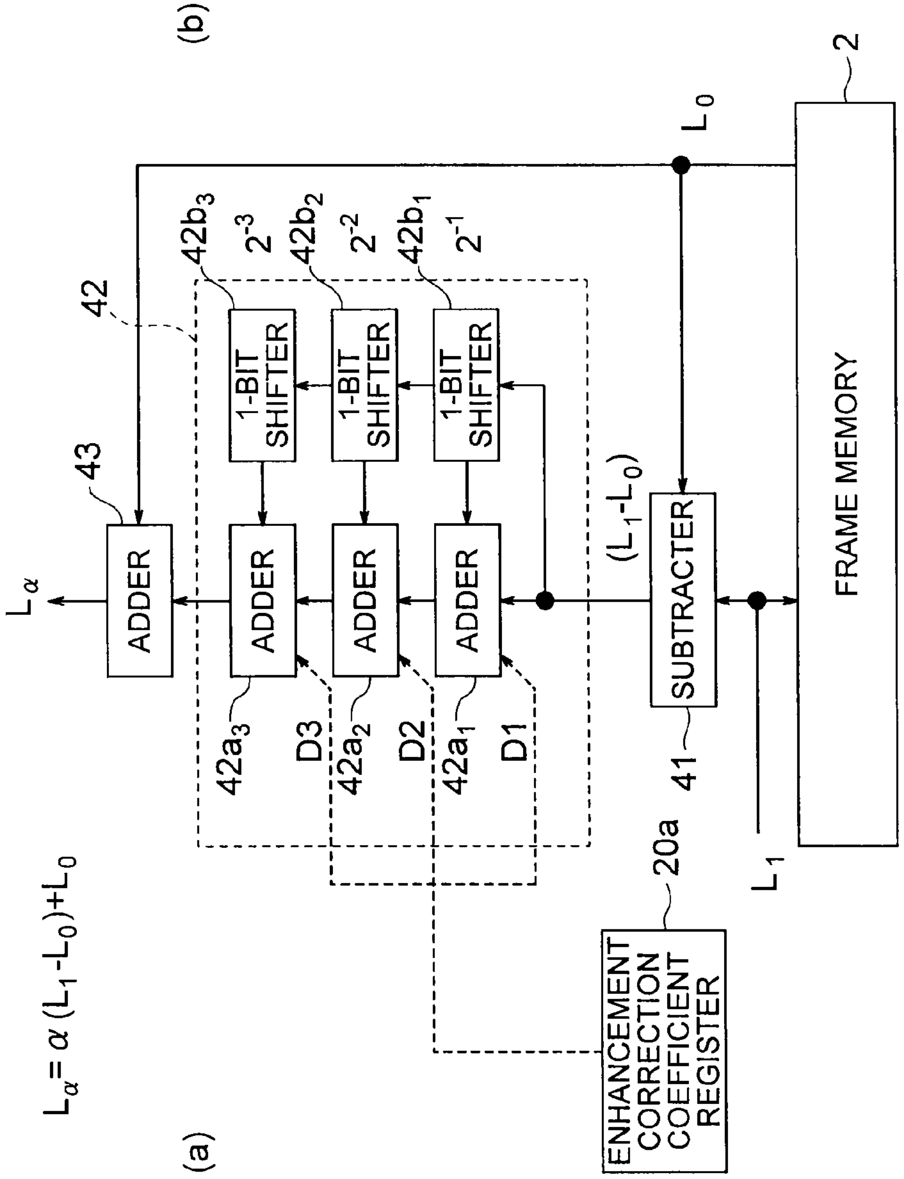
FIG. 11 is a block diagram showing a multiplier according to the first example.

A concrete circuit configuration of the multiplier 42 in the present example is shown in FIG. 11(*a*). In the enhancement correction coefficient $\alpha$ $(=\beta+(1/2^n)\times m)$ in the concrete example, $\beta$ is 1 and n is 3. In other words, $\alpha$=1.000, 1.125, 1.250, 1.375, 1.500, 1.625, 1.750 or 1.875 in this circuit. The multiplier 42 includes three adders 42*a*$_1$, 42*a*$_2$ and 42*a*$_3$, and three 1-bit shifters 42*b*$_1$, 42*b*$_2$ and 42*b*$_3$. The 1-bit shifter 42*b*$_1$ shifts the output $(=L_1-L_0)$ of the subtracter 41 one bit leftward and obtains a product value of the output $(=L_1-L_0)$ of the subtracter 41 and $2^{-1}$. The 1-bit shifter 42*b*$_2$ shifts the output of the 1-bit shifter 42*b*$_1$ one bit leftward and obtains a product value of the output of the 1-bit shifter 42*b*$_1$ and $2^{-1}$. In other words, an output of the 1-bit shifter 42*b*$_2$ becomes a product of the output $(=L_1-L_0)$ of the subtracter 41 and $2^{-2}$. The 1-bit shifter 42*b*$_3$ shifts the output of the 1-bit shifter 42*b*$_2$ one bit leftward and obtains a product value of the output of the 1-bit shifter 42*b*$_2$ and $2^{-1}$. In other words, an output of the 1-bit shifter 42*b*$_3$ becomes a product of the output $(=L_1-L_0)$ of the subtracter 41 and $2^{-3}$.

When the enhancement correction coefficient $\alpha$ holded in the register 20*a* is represented by a binary number, a value in a first place below a binary point is denoted by D1, a value in a second place below the binary point is denoted by D2, and a value in a third place below the binary point is denoted by D3. Bits below the binary point obtained when the enhancement correction coefficient $\alpha$ is represented by the binary number are represented by D1D2D3. Values of decimal numbers of the enhancement correction coefficient $\alpha$ corresponding to values of D1D2D3 are shown in FIG. 11(*b*). When D1 is "0," the adder 42*a*$_1$ passes the output of the subtracter 41 intact. When D1 is "1," the adder 42*a*$_1$ adds up the output of the subtracter 41 and the output of the 1-bit shifter 42*b*$_1$, and sends the sum to the adders 42*a*$_2$. When D2 is "0," the adder 42*a*$_2$ passes the output of the adder 42*a*$_1$ intact. When D2 is "1," the adder 42*a*$_2$ adds up the output of the adder 42*a*$_1$ and the output of the 1-bit shifter 42*b*$_1$, and sends the sum to the adders 42*a*$_3$. When D3 is "0," the adder 42*a*$_3$ passes the output of the adder 42*a*$_2$ intact. When D3 is "1," the adder 42*a*$_3$ adds up the output of the adder 42*a*$_2$ and the output of the 1-bit shifter 42*b*$_3$, and sends the sum to the adders 43. Therefore, the output of the adder 42*a*$_3$ becomes $\alpha(L_1-L_0)$.

As heretofore described, the circuit configuration of the multiplier 42 can be reduced remarkably, and a liquid crystal display apparatus which is less in picture quality degradation and as small as possible in circuit scale can be obtained.

In the present example, n in the enhancement correction coefficient $\alpha$ $(=\beta+(1/2^n)\times m)$ is 3. If n is 4, the multiplier 42 needs to further include another adder and another 1-bit shifter. In the present example, the enhancement correction coefficient $\alpha$ $(=\beta+(1/2^n)\times m)$ has a value which is at least 1 and which is less than 2. When the enhancement correction coefficient $\alpha$ has a value which is at least 2, i.e., $\beta$ is an integer of at least 2, however, the multiplier 42 needs to further include k adders and k 1-bit shifters where k is an integer of at least 1 and $2^k \leqq \beta < 2^{k+1}$ In the present example, therefore, as many adders and 1-bit shifters as the number of bits needed to represent the enhancement correction coefficient by a binary number are needed.

Second Example

Figure 12:
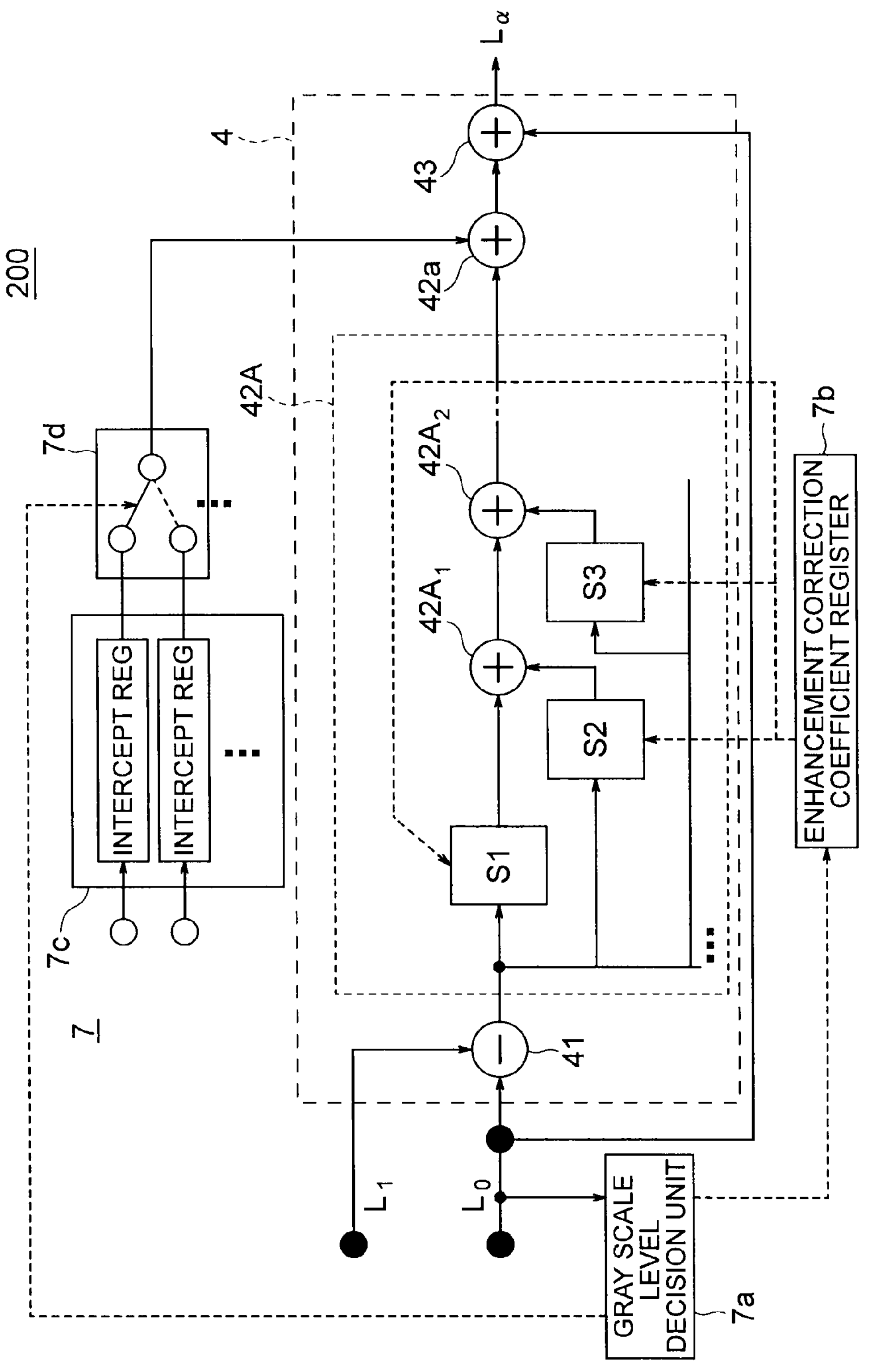
FIG. 12 is a block diagram showing a liquid crystal drive apparatus according to a second example.

A liquid crystal drive apparatus according to a second example of the present invention is shown in FIG. 12. A liquid crystal drive apparatus 200 according to the present example is, for example, a liquid crystal drive IC for portable telephone to be used in the liquid crystal display apparatus according to the third embodiment. The liquid crystal drive apparatus 200 according to the present example includes an enhancement correction coefficient computation unit 4, an enhancement correction coefficient change unit 7, and a drive signal generation unit which is not illustrated.

The enhancement correction coefficient computation unit 4 includes a subtracter 41, an α multiplier 42A, an adder 42*a*, and an adder 43. The subtracter 41 computes a difference $(L_1-L_0)$ between the input image information $L_1$ and delayed image information $L_0$. The α multiplier 42A multiplies the output $(L_1-L_0)$ of the subtracter 41 by an enhancement correction coefficient obtained when intercept data of the approximation line is not taken into consideration. The adder 42*a* adds up an output of the α multiplier 42A and intercept data selected by a switch 7*d* which will be described later. The adder 43 computes a sum $L_\alpha=(\alpha(L_1-L_0)+L_0)$ of an output $(=\alpha((L_1-L_0))$ of the adder 42*a* and the delayed image information $L_0$ sent from the frame memory 2. The drive signal generation unit 6 generates a drive signal for a liquid crystal panel (not illustrated) on the basis of the sum $L_\alpha$. An image is displayed on the liquid crystal panel.

The enhancement correction coefficient change unit 7 includes a gray scale level decision unit which makes a decision which level the gray scale level of the delayed image information $L_0$ is located on, an enhancement correction coefficient register 7*b* which holds a plurality of enhancement correction coefficient data and outputs enhancement correction coefficient data to be changed according to a result of the decision made by the gray scale level decision unit 7*a*, a memory 7*c* including a plurality of registers which store data of intercepts of approximation straight lines, and a switch 7*d* which conducts selection on intercept data stored in the registers in the memory 7*c*. As many registers as the number of approximation straight lines are prepared in the memory 7*c*. For example, in the third embodiment, the number of straight lines is three, three registers are needed. By sending a command signal from the gray scale decision unit 7*a* to the switch 7*d* to cause a switch operation, intercept data of the approximation straight line is selected. The selected intercept data is sent to the adder 42*a*.

Figure 13:
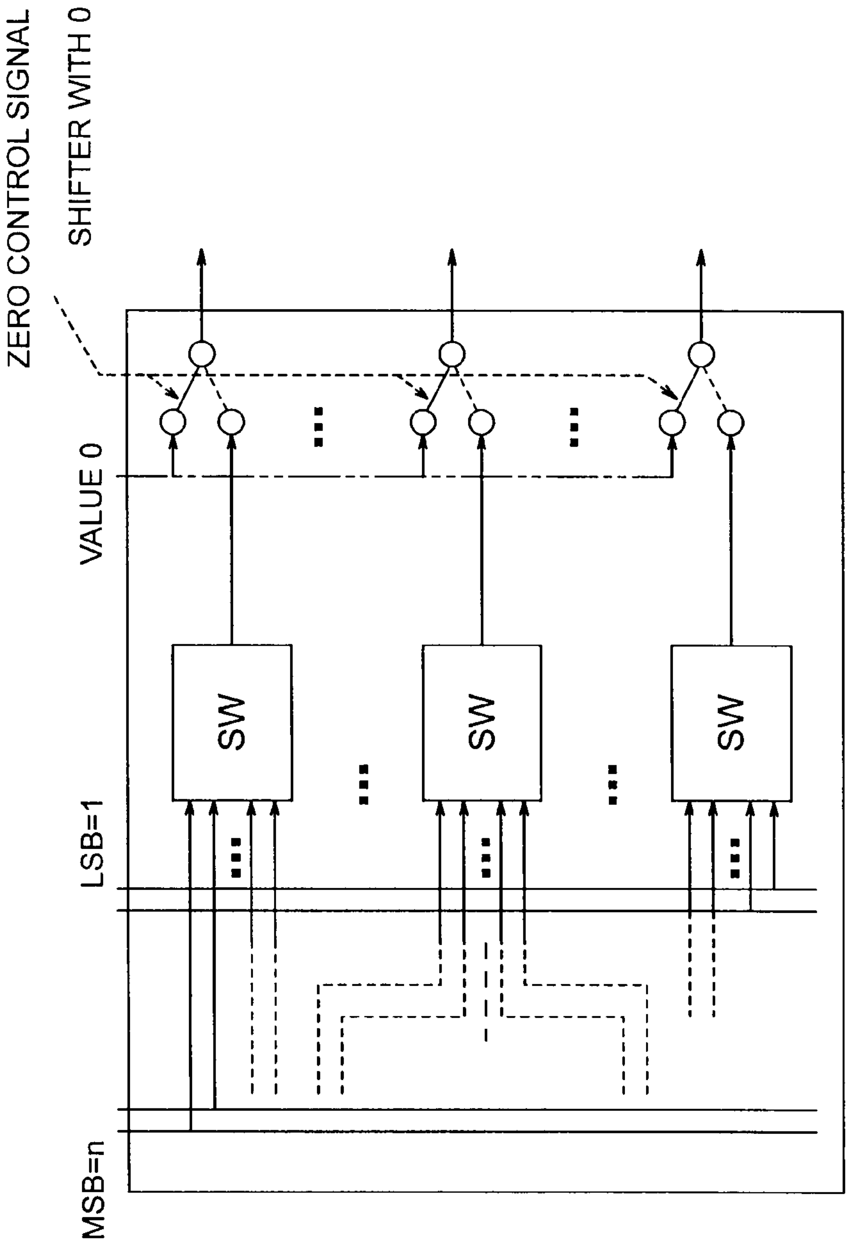
FIG. 13 is a block diagram showing a shifter with 0.

The α multiplier 42A computes $\alpha(L_1-L_0)$ with intercept data of the approximation line being not taken into consideration on the basis of the output $(L_1-L_0)$ of the subtracter 41 and data of the enhancement correction coefficient to be changed output from the enhancement correction coefficient register 7*b*. The α multiplier 42A includes a plurality of shift registers with 0, S1, S2 and S3 and a plurality of adders 42$A_1$ and 42$A_2$. In general, there are a plurality of shift registers with 0, and the number of the shift registers with 0 is increased according to the needed precision. The case where there are three shifters with 0 is taken as an example in the ensuing description. A concrete example of the shifter with 0 is shown in FIG. 13. The shifter with 0 is a shifter which can not only simply shift the input but also output a value "0" according to a zero control signal. When the value of the zero control signal has become "1," the shifter outputs a value "0." When the value of the zero control signal is "0," data obtained by shifting the input by the switches SW is output. Each shift register Si with 0 (i=1, 2, 3) shifts the output of the subtracter 41. The adder 42$A_1$ adds up an output of the shift register S1 with 0 and an output of the shift register S2 with 0. The adder 42$A_2$ adds up an output of the adder 42$A_1$ and an output of the shift register S3 with 0.

Figure 14:
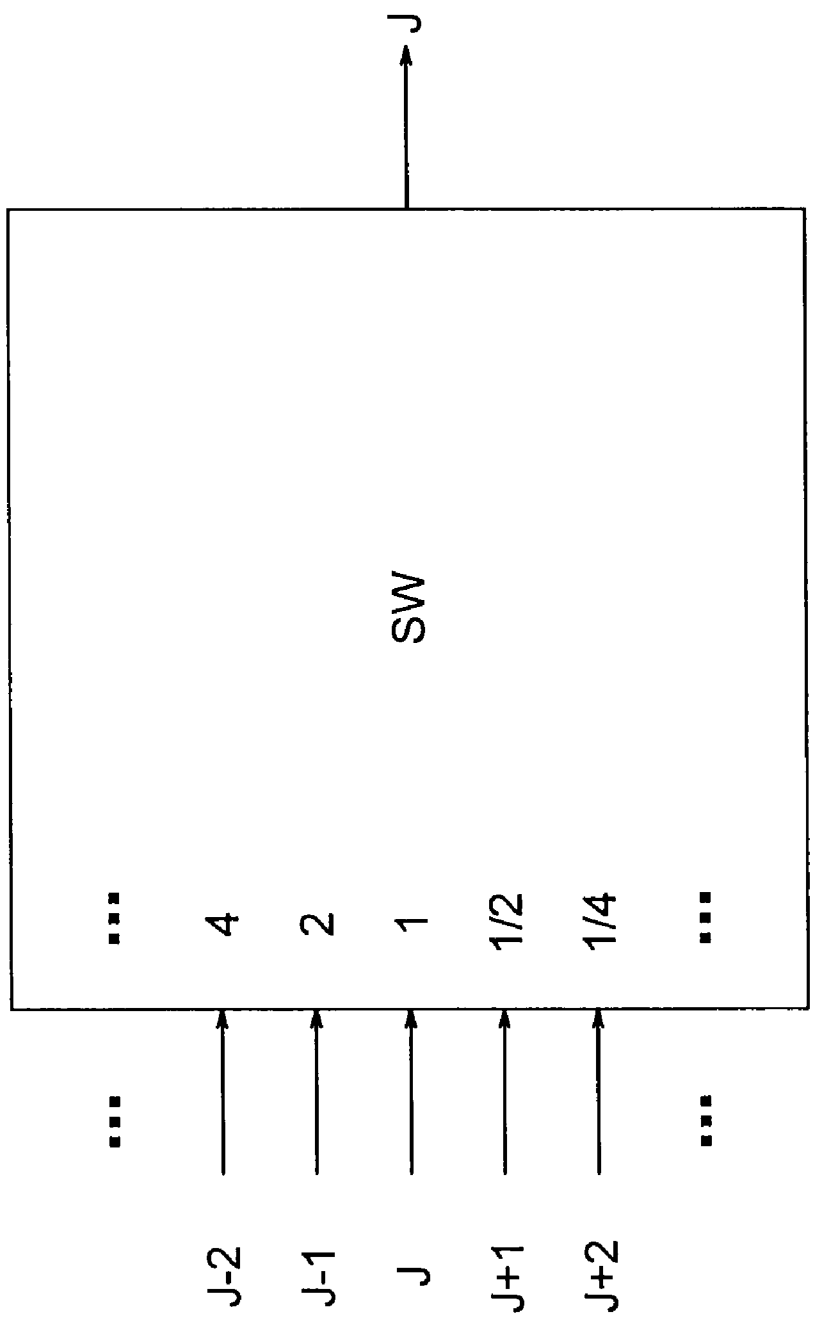
FIG. 14 is a diagram showing a concrete example of a switch in the shifter with 0.

A typical concrete example of the switch SW is shown in FIG. 14. An input J is a Jth bit of input data. For example, doubling a value can be implemented by shifting the (J−1)th bit data to the Jth bit. Therefore, parts concerning shifts of four times, twice, one time, half, and a quarter are explicitly shown in FIG. 14. Which data should be selected is indicated by the anticipated magnification value. For example, when "four times" is selected, SW=4 is expressed. Typically, the shift input should be determined according to a needed multiple.

Figure 17:
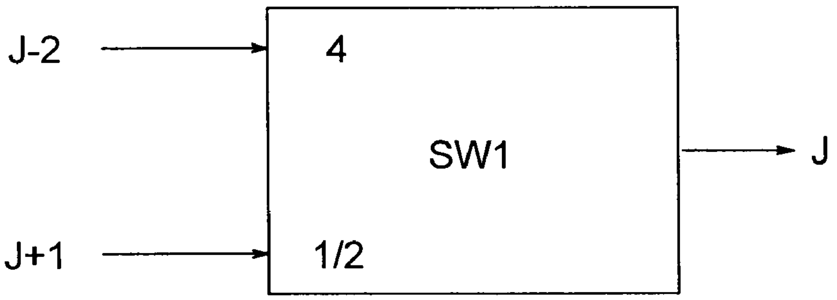
FIG. 17 is a diagram showing a concrete example of a switch SW1.
Figure 18:
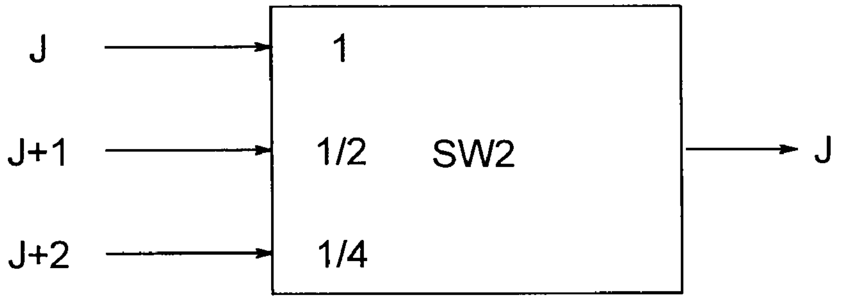
FIG. 18 is a diagram showing a concrete example of a switch SW2.
Figure 19:
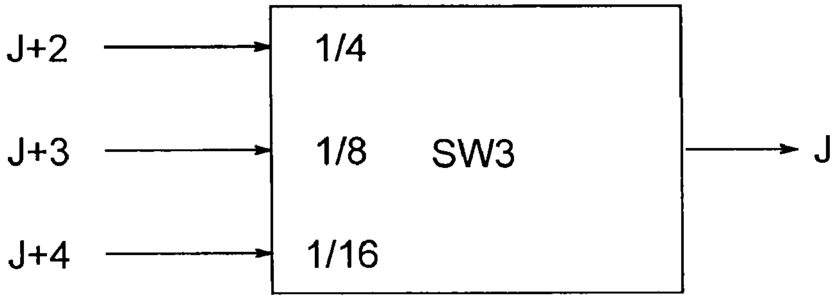
FIG. 19 is a diagram showing a concrete example of a switch SW3.

FIGS. 15 and 16 show switch state examples for selecting the enhancement correction coefficient α when implementing the second embodiment. The programmability is implemented by selecting these states. A switch SW in the shifter S1 with 0 is denoted by SW1. In the same way, a switch SW in the shifter S2 with 0 is denoted by SW2. A switch SW in the shifter S3 with 0 is denoted by SW3. The switch SW1 is shown in FIG. 17, the switch SW2 is shown in FIG. 18, and the switch SW3 is shown in FIG. 19.

FIG. 20 shows a straight line selected by the gray scale level decision unit 7*a*, values of a coefficient α and an intercept concerning the selected straight line, and switch setting states at the time of selection. For example, when the gray scale level is in the range of 0 to 255, the straight line in the first embodiment (the straight line $g_0$) is used, and α=1.250 and intercept=0. This is implemented by SW1=0, SW2=1 and SW3=¼.

When the gray scale level is in the range of −31 to −1, the straight line $g_1$ described in the third embodiment is used, and α=4.750 and intercept=0. This is implemented by SW1=4, SW2=½ and SW3=¼. Finally, when the gray scale level is in the range of −255 to −32, the straight line 92 is used, and α=0.500 and intercept=148. This is implemented by SW1=½, SW2=0 and SW3=0.

FIG. 15 corresponds to programmability for conducting fine adjustment as regards the straight line 92, and FIG. 16 corresponds to programmability for conducting fine adjustment as regards the straight line $g_1$. Although not explicitly shown here, fine adjustment can be conducted in the same way as regards the straight line $g_0$ as well.

If selection is conducted on a large number of shift inputs as shown in FIG. 14, typically implementation with high precision and a wide program range becomes possible. On the other hand, however, the switching amount also increases and the amount of hardware becomes large. Therefore, concrete examples reduced in the number of inputs as far as possible to reduce the hardware amount are switches shown in FIGS. 17 to 19. The SW1 is reduced to two inputs, the SW2 is reduced to three inputs, and the SW3 is reduced to three inputs.

Figure 21:
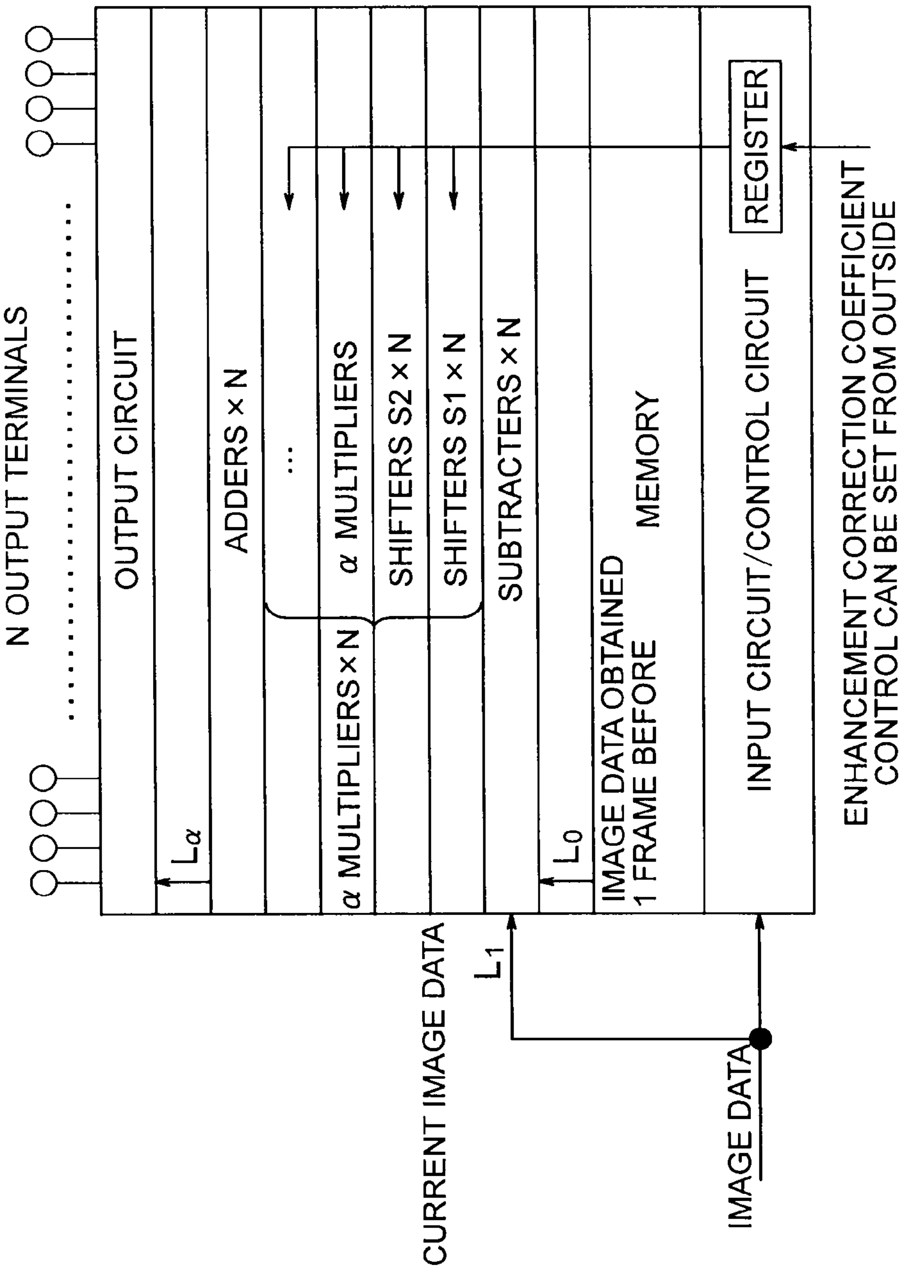
FIG. 21 is a diagram showing a layout configuration.

FIG. 21 shows a configuration of circuit blocks while imaging the layout. Each α multiplier is formed of shifters and adders, and those α multipliers are stacked.

Figure 23:
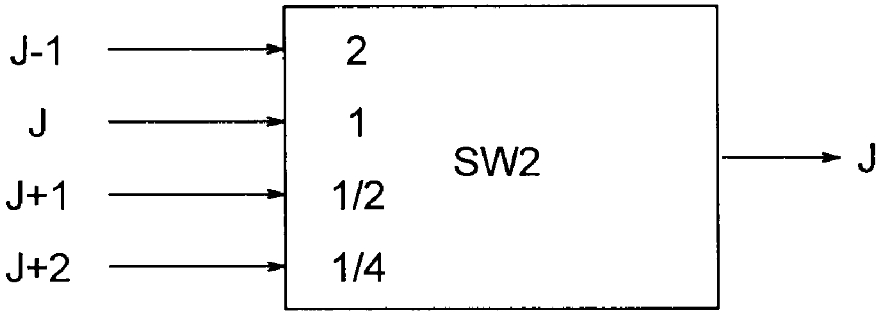
FIG. 23 is a diagram showing a switch SW2 of a shifter with 0 in an α multiplier in the second concrete example.
Figure 24:
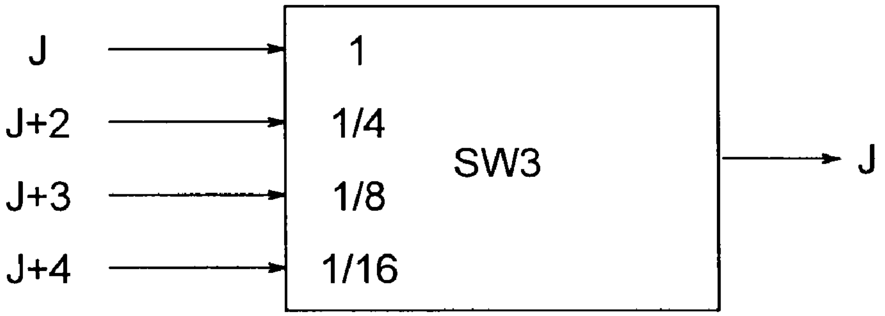
FIG. 24 is a diagram showing a switch SW3 of the shifter with 0 in the α multiplier in the second concrete example.

FIG. 22 shows switch states in a second concrete example of the α multiplier. FIG. 23 and FIG. 24 show the switch SW2 and the switch SW3 corresponding to them. The switch SW1 is the same as the switch SW1 shown in FIG. 17 of the α multiplier described earlier. In the α multiplier in the second concrete example, the number of input terminals has increased and the hardware amount has also increased. On the other hand, however, the number of states has also increased in FIG. 22, and the coping range can be made wider. For example, in FIG. 16, α=2 and α=7 cannot be implemented unlike FIG. 22.

Figure 25:
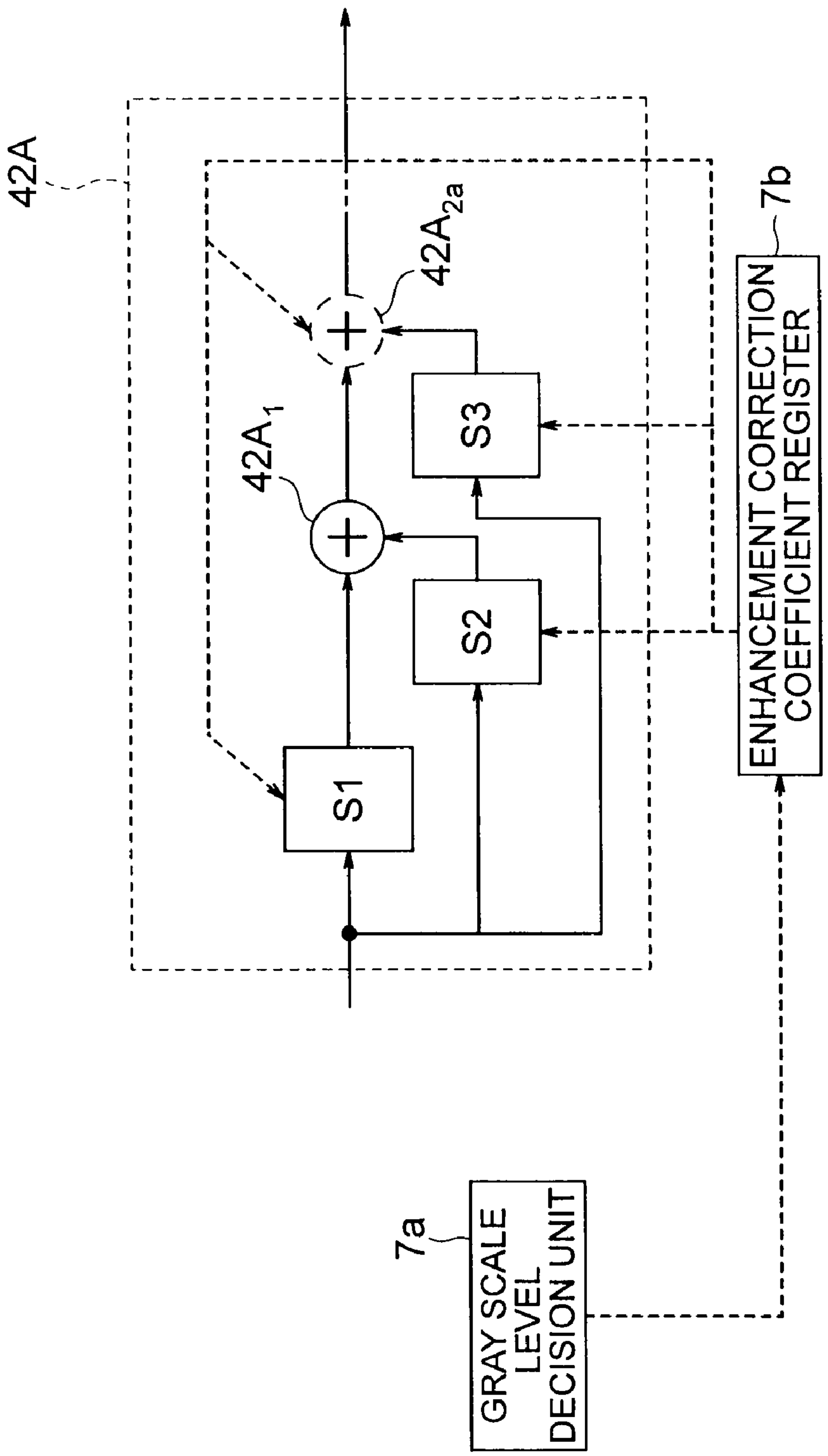
FIG. 25 is a diagram showing an α multiplier in a third concrete example.
Figure 26:
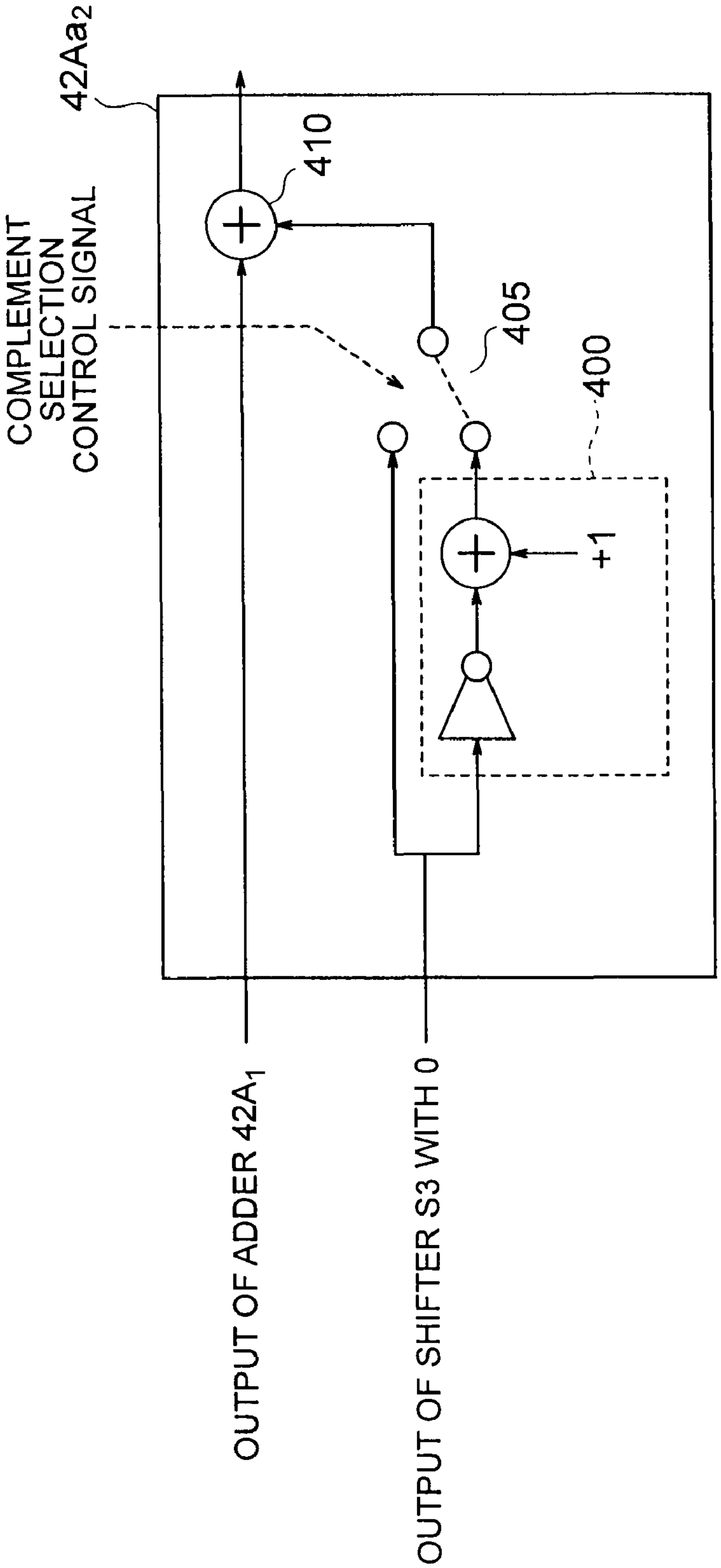
FIG. 26 is a diagram showing an adder/subtracter in the α multiplier in the third concrete example.

FIG. 25 shows a third concrete example of the α multiplier. The third concrete example has a configuration obtained by replacing the adder 42$A_2$ shown in FIG. 12 with an adder/substracter 42$A_{2a}$. Details of the adder/substracter 42$A_{2a}$ are shown in FIG. 26. The adder/substracter $42A_{2a}$ includes a complement generation circuit 400 which generates a correction of an output of the shifter S3 with 0, a switch 405 which selects one of the output of the shifter S3 with 0 and an output of the complement generation circuit 400 on the basis of a complement selection signal, and an adder 410 which adds up a value selected by the switch 405 and the output of the adder $42A_1$. The precision is further improved by thus making subtraction possible. In this case, it becomes possible to assume −1/16 as the value of the switch SW3. As shown in FIG. 27, the α value can be set in increments of 1/16. For example, +1/8 and +1/16 are implemented in FIG. 15, and 7/16 cannot be implemented. Subtraction can be implemented by obtaining a 2's complement (conducting bit reversal and adding 1) and conducting addition.

In FIG. 26, therefore, a complement generation circuit is added and a switch is controlled by a "complement selection control signal" which selects addition or subtraction. Heretofore, the α multiplier in the first concrete example, the α multiplier in the second concrete example, and the α multiplier in the third concrete example have been described. However, the α multiplier need not be restricted to them, but the actual circuit configuration should be considered with due regard to tradeoff between hardware and its precision and coping range. In addition, it is not necessary to restrict the number of shifters with 0 to three, but the configuration of the shifter with 0 can also be changed as occasion demands. Furthermore, it is not necessary to utilize all of the 0 setting functions, and it is also possible to consider various modifications as occasion demands.

Third Example

Figure 28:
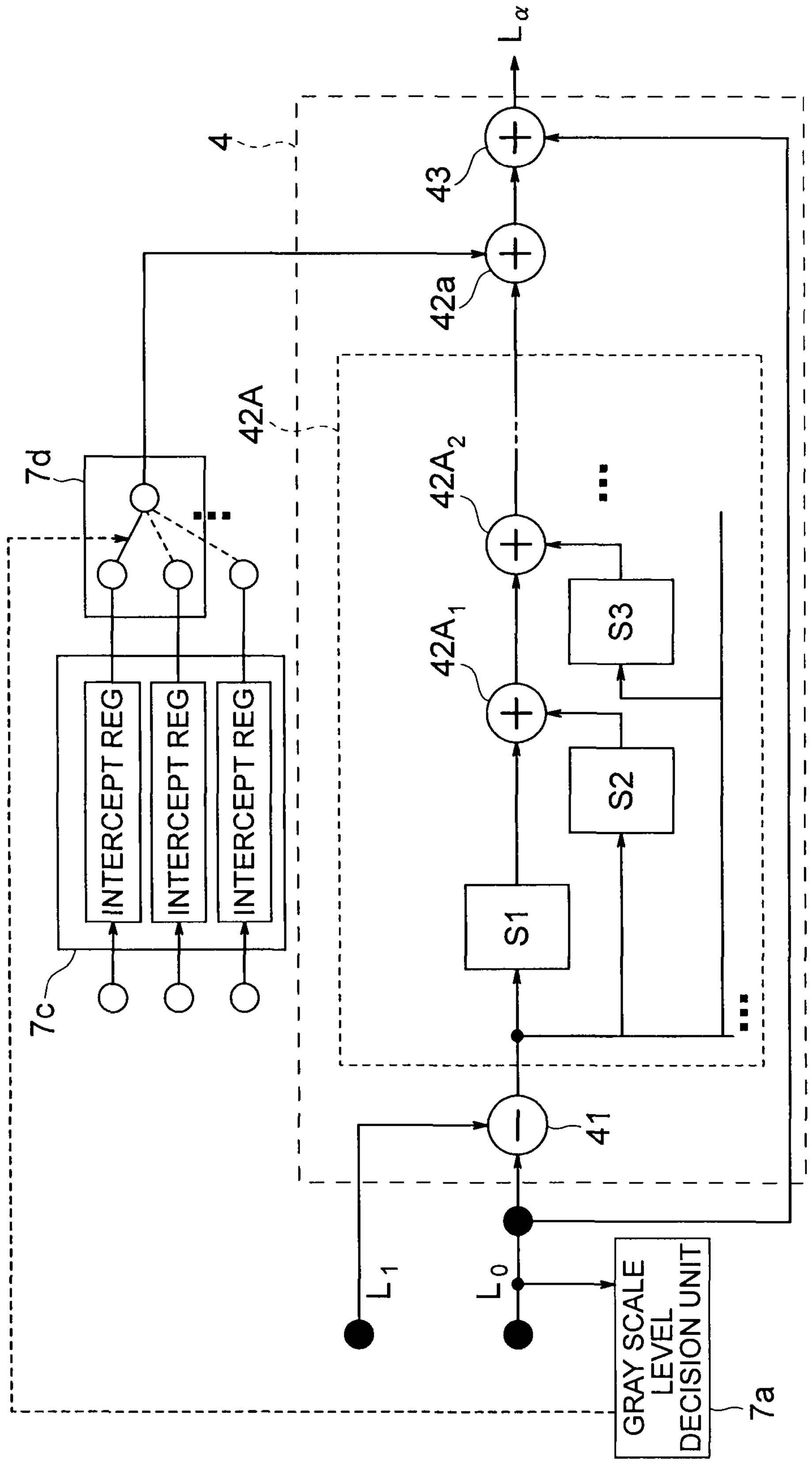
FIG. 28 is a block diagram of a liquid crystal drive apparatus according to a third example.

Finally, a liquid crystal drive apparatus according to a third example is shown in FIG. 28. The liquid crystal drive apparatus according to the present example is used in the liquid crystal display apparatus according to the fourth embodiment. The liquid crystal drive apparatus according to the present example is the same in basic configuration as the liquid crystal drive apparatus according to the second example. Since the value of the correction coefficient α is constant regardless of the gray scale level, however, calculation is conducted with a specified value. Therefore, a configuration obtained by removing the enhancement correction coefficient register 7*b* shown in FIG. 12 is used.

As heretofore described, the computation processing amount can be simplified according to the examples of the present invention. As a result, it becomes possible to display a moving picture of high quality on a liquid crystal display apparatus even in mobile devices intensely required to be low in power dissipation, light in weight and small in size, such as portable telephones.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A liquid crystal drive apparatus comprising:

a storage unit configured to store an enhancement correction coefficient having a value equal $\beta+(1/2^n)\times m$, where n is 3 or 4, and m is an integer which is at least 0 and less than $2^n$, and β is a maximum integer value which does not exceed the value of the enhancement correction coefficient;

a frame memory configured to hold digital image information of a second frame located one frame before a first frame;

a first computation unit configured to compute a difference between digital image information of the first frame and digital image information of the second frame;

a second computation unit configured to compute enhancement image information for conducting enhancement display of an image on a liquid crystal panel on the basis of the difference between digital image information of the first frame and digital image information of the second frame, digital image information of the second frame and the enhancement correction coefficient;

a third computation unit configured compute addition information by adding the digital image information of the second frame to the enhancement image information; and a drive signal generation unit configured to generate a drive signal on the basis of the addition information to drive the liquid crystal panel.

2. The apparatus according to claim 1, further comprising a setting unit configured to set the enhancement correction coefficient stored in the storage unit.

3. The apparatus according to claim 1, wherein the second computation unit is a multiplier which multiplies the difference between digital image information of the first frame and digital image information of the second frame by the enhancement correction coefficient.

4. The apparatus according to claim 3, wherein the second computation unit comprises as many adders and 1-bit shifters as the number of bits required to represent the enhancement correction coefficient by a binary number.

5. The apparatus according to claim 1, wherein digital image information of the first frame and the second frame is gray scale level information, and when a value of the gray scale level information of the second frame is in a first area, the second computation unit uses, as the enhancement correction coefficient, values obtained by performing linear approximation on relations between a gray scale level difference which is a difference between the image information of the second frame and the image information of the first frame, and an enhancement gray scale level difference which is a difference between image information of the second frame and enhancement image information for displaying the first frame on the liquid crystal panel, when the value of the gray scale level information of the second frame is in a second area different from the first area, the second computation unit approximates relations between the gray scale level difference and the enhancement gray scale level difference by a broken line formed of a plurality of straight lines and computes the enhancement image information by using inclinations of the straight lines included in the broken line, intercepts of the straight lines included in the broken line and the difference between digital image information of the first frame and digital image information of the second frame.

6. The apparatus according to claim 5, wherein the second computation unit comprises a plurality of shifters that can output a value of 0 and a plurality of adders connected in series.

7. The apparatus according to claim 6, wherein in the second computation unit, at least an adder located at a final stage in the adders is replaced by an adder/subtracter.

8. The apparatus according to claim 7, wherein the adder/subtracter comprises a complement generation circuit.

9. The apparatus according to claim 1, wherein digital image information of the first frame and the second frame is gray scale level information, and when a value of the gray scale level information of the second frame is in a first area, the second computation unit uses, as the enhancement correction coefficient, values obtained by performing linear approximation on relations between a gray scale level difference which is a difference between the image information of the second frame and the image information of the first frame, and an enhancement gray scale level difference which is a difference between image information of the second frame and enhancement image information for displaying the first frame on the liquid crystal panel, when the value of the gray scale level information of the second frame is in a second area different from the first area, the second computation unit approximates relations between the gray scale level difference and the enhancement gray scale level difference by a plurality of parallel straight lines and computes the enhancement image information by using intercepts of the parallel straight lines and the difference between digital image information of the first frame and digital image information of the second frame.

10. The apparatus according to claim 9, wherein the second computation unit comprises a plurality of shifters that can output a value of 0 and a plurality of adders connected in series.

11. The apparatus according to claim 10, wherein in the second computation unit, at least an adder located at a final stage in the adders is replaced by an adder/subtracter.

12. The apparatus according to claim 11, wherein the adder/subtracter comprises a complement generation circuit.

13. A liquid crystal display apparatus comprising:

a liquid crystal panel; and the liquid crystal drive apparatus according to claim 1 which drives the liquid crystal panel.

14. The apparatus according to claim 13, wherein the liquid crystal drive apparatus further comprises a setting unit configured to set the enhancement correction coefficient stored in the storage unit.

15. The apparatus according to claim 13, wherein the second computation unit is a multiplier which multiplies the difference between digital image information of the first frame and digital image information of the second frame by the enhancement correction coefficient.

16. The apparatus according to claim 15, wherein the second computation unit comprises as many adders and 1-bit shifters as the number of bits required to represent the enhancement correction coefficient by a binary number.

17. The apparatus according to claim 13, wherein digital image information of the first frame and the second frame is gray scale level information, and when a value of the gray scale level information of the second frame is in a first area, the second computation unit uses, as the enhancement correction coefficient, values obtained by performing linear approximation on relations between a gray scale level difference which is a difference between the image information of the second frame and the image information of the first frame, and an enhancement gray scale level difference which is a difference between image information of the second frame and enhancement image information for displaying the first frame on the liquid crystal panel, when the value of the gray scale level information of the second frame is in a second area different from the first area, the second computation unit approximates relations between the gray scale level difference and the enhancement gray scale level difference by a broken line formed of a plurality of straight lines and computes the enhancement image information by using inclinations of the straight lines included in the broken line, intercepts of the straight lines included in the broken line and the difference between digital image information of the first frame and digital image information of the second frame.

18. The apparatus according to claim 13, wherein digital image information of the first frame and the second frame is gray scale level information, and when a value of the gray scale level information of the second frame is in a first area, the second computation unit uses, as the enhancement correction coefficient, values obtained by performing linear approximation on relations between a gray scale level difference which is a difference between the image information of the second frame and the image information of the first frame, and an enhancement gray scale level difference which is a difference between image information of the second frame and enhancement image information for displaying the first frame on the liquid crystal panel, when the value of the gray scale level information of the second frame is in a second area different from the first area, the second computation unit approximates relations between the gray scale level difference and the enhancement gray scale level difference by a plurality of parallel straight lines and computes the enhancement image information by using intercepts of the parallel straight lines and the difference between digital image information of the first frame and digital image information of the second frame.

19. The apparatus according to claim 17, wherein the second computation unit comprises a plurality of shifters that can output a value of 0 and a plurality of adders connected in series.

20. The apparatus according to claim 19, wherein in the second computation unit, at least an adder located at a final stage in the adders is replaced by an adder/subtracter.

* * * * *